US012520081B1

(12) United States Patent
Curran et al.

(10) Patent No.: US 12,520,081 B1
(45) Date of Patent: Jan. 6, 2026

(54) PORTABLE AUDIO SPEAKER SYSTEM

(71) Applicant: Noxgear, LLC, Worthington, OH (US)

(72) Inventors: Simon Curran, Columbus, OH (US); Thomas Walters, Powell, OH (US)

(73) Assignee: Noxgear, LLC, Worthington, OH (US)

( * ) Notice: Subject to any disclaimer, the term of this patent is extended or adjusted under 35 U.S.C. 154(b) by 0 days.

(21) Appl. No.: 19/087,503

(22) Filed: Mar. 22, 2025

Related U.S. Application Data

(60) Division of application No. 18/386,879, filed on Nov. 3, 2023, which is a continuation of application No. 17/727,793, filed on Apr. 24, 2022, now Pat. No. 11,812,242, which is a continuation of application No. 17/073,142, filed on Oct. 16, 2020, now Pat. No. 11,317,209.

(60) Provisional application No. 62/923,259, filed on Oct. 18, 2019.

(51) Int. Cl.
*H04R 5/02* (2006.01)
*H04R 1/02* (2006.01)

(52) U.S. Cl.
CPC ............... *H04R 5/02* (2013.01); *H04R 1/025* (2013.01); *H04R 1/026* (2013.01); *H04R 2201/02* (2013.01)

(58) Field of Classification Search
CPC .......... H04R 5/02; H04R 1/025; H04R 1/026; H04R 2201/02
See application file for complete search history.

(56) References Cited

U.S. PATENT DOCUMENTS

D149,704 S 5/1948 Runge
D186,603 S 11/1959 Jahn
4,057,124 A 11/1977 Braden
(Continued)

FOREIGN PATENT DOCUMENTS

CN 208316928 U 1/2019
CN 208509194 U 2/2019
CN 210609654 U 5/2020

OTHER PUBLICATIONS

"Bit: Wearable Bluetooth Speaker", Polk Website, Web page <https://www.polkaudio.com/en/portable-speakers/boom-bit>, 10 pages, dated at least as early as Sep. 10, 2019, retrieved from www.polkaudio.com website on Nov. 15, 2020.
(Continued)

*Primary Examiner* — Andrew Sniezek
(74) *Attorney, Agent, or Firm* — The Law Office of Patrick F. O'Reilly III, LLC

(57) ABSTRACT

A portable audio speaker system is disclosed herein. In one or more embodiments, the portable audio speaker system includes at least one speaker assembly including a housing; a speaker element disposed inside of the housing; a charging interface disposed on the housing and configured to receive electrical power from an external source to charge an internal power supply of the portable audio speaker system; and a clip member coupled to the housing, the clip member and the housing together forming a clipping device. The clipping device allows the housing to be coupled to, and decoupled from, an edge of an item. In one or more further embodiments, the portable audio speaker system includes a control button configured to control a plurality of functions of the at least one speaker assembly and/or a spring element coupling the clip member to the housing.

22 Claims, 20 Drawing Sheets

(56) References Cited

U.S. PATENT DOCUMENTS

| | | | | |
|---|---|---|---|---|
| 4,100,653 | A * | 7/1978 | Sensabaugh | H04M 1/05 381/364 |
| D326,653 | S | 6/1992 | Hino | |
| D351,836 | S | 10/1994 | Nagele et al. | |
| 5,678,281 | A | 10/1997 | Kamp et al. | |
| D395,433 | S | 6/1998 | Kee | |
| 6,118,380 | A | 9/2000 | Gannon | |
| 6,765,436 | B1 * | 7/2004 | Melanson | H03F 3/217 330/132 |
| D533,184 | S | 12/2006 | Kim | |
| D603,846 | S | 11/2009 | Tkachuk | |
| D608,767 | S | 1/2010 | Liner | |
| D613,273 | S | 4/2010 | Linér et al. | |
| D616,464 | S | 5/2010 | Park | |
| 7,808,392 | B1 | 10/2010 | Anklesaria | |
| D630,187 | S | 1/2011 | Ching | |
| 8,317,067 | B2 | 11/2012 | Lewis | |
| 8,750,541 | B1 * | 6/2014 | Dong | H04R 3/12 381/310 |
| D720,637 | S | 1/2015 | Au Yeung | |
| D723,513 | S | 3/2015 | Corval | |
| D733,096 | S | 6/2015 | Faerber et al. | |
| D733,683 | S | 7/2015 | Faerber et al. | |
| D748,609 | S | 2/2016 | Miller et al. | |
| 9,264,791 | B1 | 2/2016 | Polivy | |
| 9,265,294 | B2 | 2/2016 | Ellis et al. | |
| D758,901 | S | 6/2016 | Benoit et al. | |
| D760,098 | S | 6/2016 | Benoit et al. | |
| 9,374,509 | B2 | 6/2016 | Pillarisetty et al. | |
| D798,838 | S | 10/2017 | DiTullo et al. | |
| D815,061 | S | 4/2018 | Wei | |
| D822,656 | S | 7/2018 | Ritchie et al. | |
| 10,182,278 | B2 | 1/2019 | Yanofsky et al. | |
| 10,244,806 | B2 | 4/2019 | Marks | |
| 10,264,355 | B2 | 4/2019 | Klingler et al. | |
| 10,405,090 | B2 | 9/2019 | Cross et al. | |
| D896,676 | S | 9/2020 | Lardi | |
| D936,630 | S | 11/2021 | Curran et al. | |
| 11,317,209 | B1 | 4/2022 | Curran et al. | |
| 11,812,242 | B1 | 11/2023 | Curran et al. | |
| 2008/0023508 | A1 | 1/2008 | Harchol | |
| 2008/0172841 | A1 | 7/2008 | Babasaki | |
| 2008/0287166 | A1 | 11/2008 | Lin | |
| 2009/0128785 | A1 | 5/2009 | Silverstein | |
| 2011/0269336 | A1 * | 11/2011 | Nashimoto | F21V 21/145 439/504 |
| 2013/0331153 | A1 | 12/2013 | Krimstock | |
| 2014/0029782 | A1 | 1/2014 | Rayner | |
| 2014/0086441 | A1 | 3/2014 | Zhu et al. | |
| 2016/0066084 | A1 | 3/2016 | Chua et al. | |
| 2016/0324442 | A1 * | 11/2016 | Zdeblick | A61B 5/0537 |
| 2016/0366499 | A1 | 12/2016 | McGarry et al. | |
| 2017/0070195 | A1 | 3/2017 | Arknaes-Pedersen | |
| 2017/0359641 | A1 | 12/2017 | Yanofsky et al. | |
| 2020/0382063 | A1 * | 12/2020 | Delano | H03F 3/2173 |
| 2021/0093028 | A1 | 4/2021 | Grinnell | |

OTHER PUBLICATIONS

"Zulu Alpha—Magnetic Wearable Bluetooth® Speakers (Black or White)", Zulu Audio Website, Web page <https://zuluaudio.com/product/wearable-bluetooth-speakers/>, 4 pages, dated at least as early as Sep. 10, 2019, retrieved from www.zuluaudio.com website on Nov. 15, 2020.

"TOKK Smart Wearable Assistant Hands-Free Bluetooth Speaker Phone, Red", Amazon Website, Web page <https://www.amazon.com/TOKK-Wearable-Assistant-Hands-Free-Bluetooth/dp/B01N3KN1FD?th=1>, 11 pages, dated at least as early as Sep. 10, 2019, retrieved from www.amazon.com website on Nov. 15, 2020.

Gnomeproof Gadgets—Noxgear 39g Wearable Bluetooth Speaker, Oct. 6, 2020, [retrieved Mar. 23, 2021], Retrieved from Internet, URL: <https://fat-bike.com/2020/10/gnomeproof-gadgets-noxgear-39g-wearable-bluetooth-speaker/> (Year: 2020).

Noxgear 39g Speaker Review, Aug. 30, 2020, [retrieved Mar. 23, 2021], Retrieved from Internet, URL: <https://www.youtube.com/watch?v=TY9If7piHuw> (Year: 2020).

Restriction requirement in U.S. Appl. No. 29/710,021, mailed on Nov. 17, 2020.

Ex Parte Quayle Action in U.S. Appl. No. 29/710,021, mailed on Mar. 30, 2021.

Notice of Allowance in U.S. Appl. No. 29/710,021, mailed on Jun. 25, 2021.

Wearable Bluetooth Speaker, question date: Feb. 27, 2020, [retrieved Sep. 6, 2022), Retrieved from Internet, URL: <https://www.noxgear.com/39g> (Year: 2020).

Noxgear 39g Wearable Waterproof Bluetooth Speaker, date first available: Apr. 24, 2020, [retrieved Sep. 6, 2022], Retrieved from Internet, URL: <https://www.amazon.com/Noxgear-39g-Wearable-Bluetooth-Speaker/dp/B087MXMWHN> (Year: 2020).

NoxGear 39g Bluetooth Speaker Review, date not available, [retrieved Sep. 6, 2022], Retrieved from Internet, URL: <https://buckyrides.com/noxgear-39g-bluetooth-speaker-review/> (Year: 2022).

First office action on the merits (Non-Final Rejection) in U.S. Appl. No. 17/073,142, mailed on Jul. 28, 2021.

Notice of Allowance in U.S. Appl. No. 17/073,142, mailed on Dec. 20, 2021.

First office action on the merits (Non-Final Rejection) in U.S. Appl. No. 29/816,481, mailed on Jan. 20, 2023.

Second office action on the merits (Final Rejection) in U.S. Appl. No. 29/816,481, mailed on Nov. 6, 2023.

Notice of Allowance in U.S. Appl. No. 29/816,481, mailed on Apr. 8, 2024.

"GoPro Magnetic Swivel Clip", 2 pages total, Web page (p. 1 of 2): <https://gopro.com/en/us/shop/mounts-accessories/magnetic-swivel-clip/ATCLP-001.html>, Web page (p. 2 of 2): <https://web.archive.org/web/20191004185321/https://gopro.com/en/us/shop/mounts-accessories>, dated at least as early as Oct. 4, 2019, retrieved from www.gopro.com and www.web.archive.org websites on Aug. 15, 2024.

"Two Little Fishies VeggieMag and MegaVeggieMag Clips", 2 pages total, Web page (p. 1 of 2): <https://twolittlefishies.com/aquarium-accessories>, Web page (p. 2 of 2): <https://web.archive.org/web/20181224081436/http://www.twolittlefishies.com/tlf_prod_access.php?lang_id=1>, dated at least as early as Dec. 24, 2018, retrieved from www.twolittlefishies.com and www.web.archive.org websites on Aug. 15, 2024.

First office action on the merits (Non-Final Rejection) in U.S. Appl. No. 17/727,793, mailed on Jan. 24, 2023.

Notice of Allowance in U.S. Appl. No. 17/727,793, mailed on Jul. 3, 2023.

Request for Ex Parte Reexamination in Proceeding No. 90/019,752, dated Dec. 3, 2024.

Order Granting Request for Ex Parte Reexamination in Proceeding No. 90/019,752, mailed on Dec. 30, 2024.

First office action on the merits (Non-Final Action) in Ex Parte Reexamination Proceeding No. 90/019,752, dated Apr. 2, 2025.

First office action on the merits (Non-Final Rejection) in U.S. Appl. No. 18/386,879, mailed on May 14, 2024.

Second office action on the merits (Final Rejection) in U.S. Appl. No. 18/386,879, mailed on Sep. 23, 2024.

Third office action on the merits (Non-Final Rejection) in U.S. Appl. No. 18/386,879, mailed on Mar. 27, 2025.

Second office action on the merits (Final Action) in Ex Parte Reexamination Proceeding No. 90/019,752, dated Jul. 8, 2025.

Notice of Intent to Issue a Reexam Certificate in Ex Parte Reexamination Proceeding No. 90/019,752, dated Sep. 30, 2025.

Fourth office action on the merits (Final Rejection) in U.S. Appl. No. 18/386,879, mailed on Oct. 24, 2025.

* cited by examiner

Section A-A

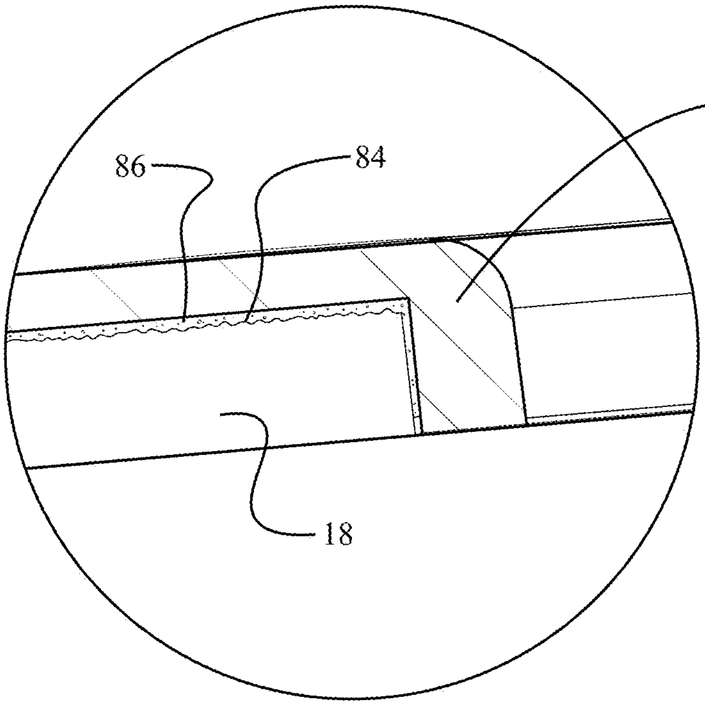
Detail "A"
FIG. 19
FIG. 20
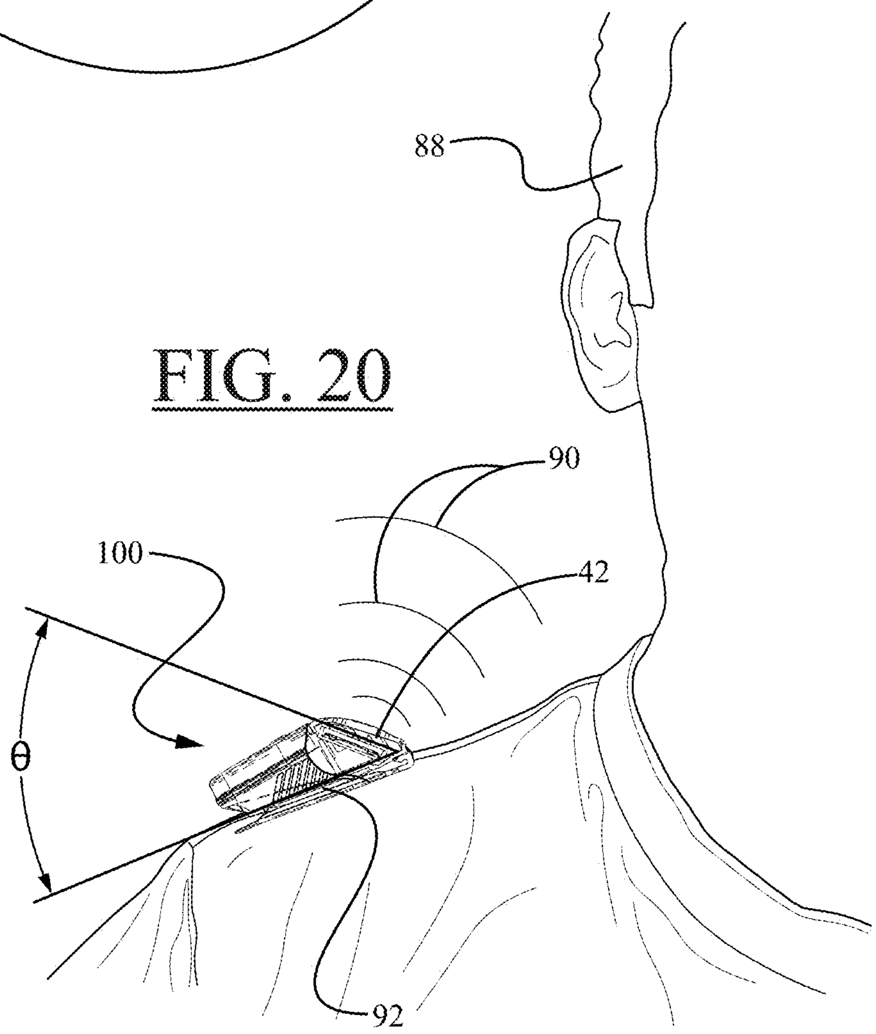

PORTABLE AUDIO SPEAKER SYSTEM

CROSS-REFERENCE TO RELATED APPLICATIONS

This is a divisional of U.S. patent application Ser. No. 18/386,879, entitled "Electronic Device With Multiple Modes Of Attachment", filed on Nov. 3, 2023; which is a continuation of U.S. patent application Ser. No. 17/727,793, entitled "Electronic Device With Multiple Modes Of Attachment", filed on Apr. 24, 2022, now U.S. Pat. No. 11,812,242; which is a continuation of U.S. patent application Ser. No. 17/073,142, entitled "Electronic Device With Multiple Modes Of Attachment", filed on Oct. 16, 2020, now U.S. Pat. No. 11,317,209; and further claims the benefit of U.S. Provisional Patent Application No. 62/923,259, entitled "Attachment Device And A Portable Speaker Using The Same", filed on Oct. 18, 2019, the disclosure of each of which is hereby incorporated by reference as if set forth in their entireties herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to an electronic device, such as a portable audio speaker system, with multiple methods of attaching to clothing or other structures. More particularly, the invention relates to a portable audio speaker system that is able to be worn by a user as a replacement for conventional headphones using multiple methods of attachment.

2. Background

Headphones are commonly worn by individuals during walking, jogging, and exercising so that the individuals are able to enjoy music or other types of audio broadcasts during the performance of these activities. However, headphones are dangerous because they can get caught on various objects, such as the clothing of the user, and they do not allow for the situational awareness of the user. Also, headphones get sweaty and uncomfortable during the performance of physical activities, such as jogging.

Therefore, what is needed is a portable lightweight speaker that is able to be worn on the clothing of a user while the user is performing a physical activity so as to obviate the need for the wearing of headphones. Moreover, a portable speaker is needed that is sufficiently loud without requiring excessive battery power and/or resulting in a significant reduction in battery life. Furthermore, there is a need for a portable speaker that is durable, generally waterproof, and is able to communicate via a personal area network, such as Bluetooth®.

Small wearable devices, such as conventional wearable speakers, often use a standard clip for securement to a garment of a user. Although, devices that use a standard clip are limited in their ability to attach to objects and articles of clothing. By design, a standard clip is required to receive only the edge of an article, such as a belt, shirt collar, strap, etc. to secure the device. A standard clip is typically mechanically attached to the device and is open to accept the edge of a strap, clothing (e.g., shirt collar), etc. such that the device is on one side of the item and the clip spans to the opposite side of the item, thus securing it to the user.

On the other hand, a device with a magnetic clip has a different set of limitations. A magnetic clip being an element that secures the device by pressure and friction through an intermediate material (e.g., a shirt) via magnetic force, and not a mechanical coupling to the device when in use, between two or more magnets or at least one magnet and a ferromagnetic element. Because the pressure holding the magnetic elements is inversely related to the square of the distance, then it is not suitable to use a magnetic clip, when considering device weight especially, to attach a device to a thicker object, such as a belt or strap. The main advantage of such a magnetic clip is to attach the device to a shirt or thin article of clothing far from an edge where a standard clip would be used. For example, the standard clip is not suitable for a garment that extends high up a user's neck as the device, when clipped to an edge near the neck, is likely to contact the user's neck or chin and create discomfort. However a standard clip is preferable to attach the device to a thick strap, for example, when considering that the size and weight of the magnetic clip that could attach to a thick strap would be too large and heavy.

Also, magnetic clips designed to secure a device to a user are designed to maximize their flux and attractive strength between the magnetic elements and so they will not allow the device to be magnetically attached to a third magnetic surface unless the magnetic elements are separated. The element that is removed from the device can then be lost or forgotten, later rendering the original magnetic clip inoperable.

When the device is meant to be attached to an article of clothing on an active user, then it is paramount to reduce the weight and size of the attachment apparatus or it will become prohibitively heavy causing bouncing, rocking, and user discomfort.

Therefore, what is needed is an attachment device that has the advantages of both a standard clip (i.e., securing a device to the edge of an article of clothing, belt, strap, etc.) and a magnetic clip (i.e., securing a device to a non-edged portion of an article of clothing or accessory worn by a user). Securing to a non-edge portion meaning that the device and clip are not required to have a continuous physical structure that spans from one side of a piece of clothing, strap, etc. across the edge and to the opposing side of that item to secure it to the user. Moreover, an attachment device is needed where a magnetic clip is able to remain on the device when the attachment device is operated as a standard clip, and when a magnet on the device is used for securing the device to another ferromagnetic surface. Furthermore, there is a need for an attachment device that is minimal in size and weight, and has no more weight or size than a device tasked with performing as only a magnetic clip or standard clip. Despite the existence in prior art of stand-alone standard clips and stand-alone magnetic clips and the list of advantages for a device that utilizes both, the combination has not yet been employed for a wearable electronic device because it is not evident to combine these elements in a manner that achieves all the advantages, including a secure hold, but does not take away from the function of either clip and does not increase the weight of the device. Maintaining the full set of advantages for each clip type is essential in a versatile device.

Magnetic clips, such as those described above, often use neodymium magnets for securement as a result of their high strength per weight characteristics. When used in such an application, the plating of the neodymium magnets is an important process to protect the magnet against their working environment. Plating neodymium magnets is an electrolytic based process and cannot be done after the magnet has been magnetized or "charged". All neodymium iron boron magnets must be plated to avoid oxidation. Nickel and zinc are often preferred because of their excellent resistance to abrasion and preferred aesthetics. When used in consumer products they allow magnets to slide and impact other magnets without leaving marks.

However, these surface platings have two notable problems. First, they are smooth and do not allow adhesives to form a strong bond. In use magnets can come together with high velocity and incur large impact forces and cause the weak adhesive bond to fail. Second, the attraction force between two magnets obeys the inverse square of the distance. So any structure placed between the two magnets to secure them has a significant impact on strength. This is particularly a problem when strength versus weight is considered, which is almost always the case, and is what gives neodymium magnets their large advantage over other magnets.

Any attempt to mechanically roughen or grind the magnet surface to increase surface area is tedious and cannot be done in mass production. That is because the thickness of each magnet is slightly different, so a bulk grinding process would over grind a large percentage, rendering them useless, while others would have been treated too lightly and the adhesive would fail. It is imperative that the surface visible to the consumer and that contacts the mating magnet is not affected by this treatment. Furthermore, the plating that is ground off becomes magnetically attracted to the magnet so removing it completely is not possible.

Therefore, what is needed is an etching process for magnets that allows an adhesive to more securely bond the magnets to the objects containing the magnets. In addition, supplemental securement means for the magnets are needed so that the magnets are far less likely to become inadvertently detached from the objects to which they are secured.

Other problems also exist with conventional wearable speakers that are worn by a user, such as inadequate sound pressure levels and improper sound delivery angles.

By Ohm's Law, the direct current resistance (DCR) of a speaker and the back-emf voltage combine to dictate how much voltage is required at the speaker driver terminals to produce a measurable sound pressure level (SPL). Today's portable small rechargeable devices typically run on a single Li-Ion cell with a nominal voltage of 3.7 VDC and off-the-shelf speakers are 4 ohms and 8 ohms. In order to achieve high SPL from 4+ ohm speakers, the single battery cell voltage must be boosted to around 10 VDC. Adding more battery cells to increase voltage is prohibitive because of the additional weight for portable applications. Also, there are no single cell amplifiers that boost to this voltage range. Most boost to between 5-6 VDC or 12-18 VDC. Also, the amplifier becomes less efficient when it is boosted to higher voltages.

Any conventional product with a speaker designed to be attached to an article of clothing on the body has the speaker facing directly out and away from the body. This creates many issues. First, the treble clef is attenuated by 3 dB or more to the listener as a result of being out of the direct path of the speaker. That is because at higher frequencies (treble) sound is more directional. Second, the user must increase the volume of their speaker to make up for the loss in dB or parametrically affect the equalizer settings to boost this range. For every 3 dB increase in SPL, power is needed to increase by two times. The result is a speaker which consumes significantly more power, and is heavier as a result of needing a larger power source. Or for the same size power source, the battery life will be significantly decreased.

Therefore, what is needed is a portable speaker that is able to produce a high sound pressure level without requiring excessive battery power. Moreover, a portable speaker is needed that is designed to deliver the sound in a direction more closely aligned with one or more cars of the user so that the treble clef will not be attenuated and less power will be consumed.

BRIEF SUMMARY OF EMBODIMENTS OF THE INVENTION

Accordingly, the present invention is directed to an attachment device and a portable speaker that substantially obviates one or more problems resulting from the limitations and deficiencies of the related art.

In accordance with one or more embodiments of the present invention, there is provided a portable audio speaker system that comprises at least one speaker assembly including a housing; a speaker transducer disposed inside of the housing; a clip member coupled to the housing, and the clip member including a clip cutout; a first magneto coupler, separate from any magnet of the speaker transducer, coupled to the housing; and a removable member having a second magneto coupler, at least a portion of the removable member fitting within the boundary of the clip cutout. In these one or more embodiments, the second magneto coupler of the removable member is capable of being magnetically coupled to the first magneto coupler that is coupled to the housing, so that the magnetic coupling allows the housing to be attached to a non-edge portion of a non-metallic and/or non-magnetic item when the item is placed between the first magneto coupler and the removable member, and the clip member allows the housing to be attached to, and detached from, an edge of a non-metallic and/or non-magnetic item when the removable member is magnetically coupled to the housing, and there is no item between the first magneto coupler and removable member.

In accordance with one or more other embodiments of the present invention, there is provided an electronic device that comprises a device assembly including a housing; a clip member coupled to the housing; a first magneto coupler coupled to the housing; and a removable member having a second magneto coupler. In these one or more embodiments, the second magneto coupler of the removable member is capable of being magnetically coupled to the first magneto coupler that is coupled to the housing, so that the magnetic coupling allows the housing to be attached to a non-edge portion of a non-metallic and/or non-magnetic item when the item is placed between the first magneto coupler and the removable member, and the clip member allows the housing to be attached to, and detached from, an edge of a non-metallic and/or non-magnetic item when the removable member is magnetically coupled to the housing, and there is no item between the first magneto coupler and removable member.

In accordance with yet one or more other embodiments of the present invention, there is provided an electronic device that comprises a device assembly including a housing; a first magneto coupler coupled to the housing; and a clip member having a second magneto coupler. In these one or more embodiments, the second magneto coupler of the clip member is capable of being magnetically coupled to the first magneto coupler of the housing, the clip member and the housing together forming a clipping device; the clipping device allows the housing to be attached to, and detached from, an edge of a non-metallic or non-magnetic item; and the magnetic coupling of the second magneto coupler to the first magneto coupler allows the housing to be attached to a non-metallic or non-magnetic item independent of the clipping device when the item is placed between the first magneto coupler and the clip member.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 19 is an enlarged sectional view illustrating the manner in which the magnet is attached to the removable member of the portable speaker of FIG. 1 (Detail "A");

FIG. 20 is a perspective view illustrating the upward facing speaker orientation of the portable speaker of FIG. 1 when the portable speaker is attached to a garment of a user;

Throughout the figures, the same parts are always denoted using the same reference characters so that, as a general rule, they will only be described once.

DETAILED DESCRIPTION OF EMBODIMENTS OF THE INVENTION

An illustrative embodiment of a portable audio system is seen generally at 100 in FIGS. 1-9. The illustrative portable speaker 100 generally comprises a speaker transducer (e.g. standard loudspeaker transducer with a dust cap, diaphragm and magnet or a piezo-based device) and associated electronics enclosed with a rear housing portion 26 and a front housing portion 40. An attachment device 10, 20 is provided on the rear housing portion 26 of the speaker 100 for securing the portable speaker 100 to various objects (e.g., articles of clothing worn by a user, etc.). The various aspects of the illustrative portable speaker 100 will be described hereinafter.

Figure 28:
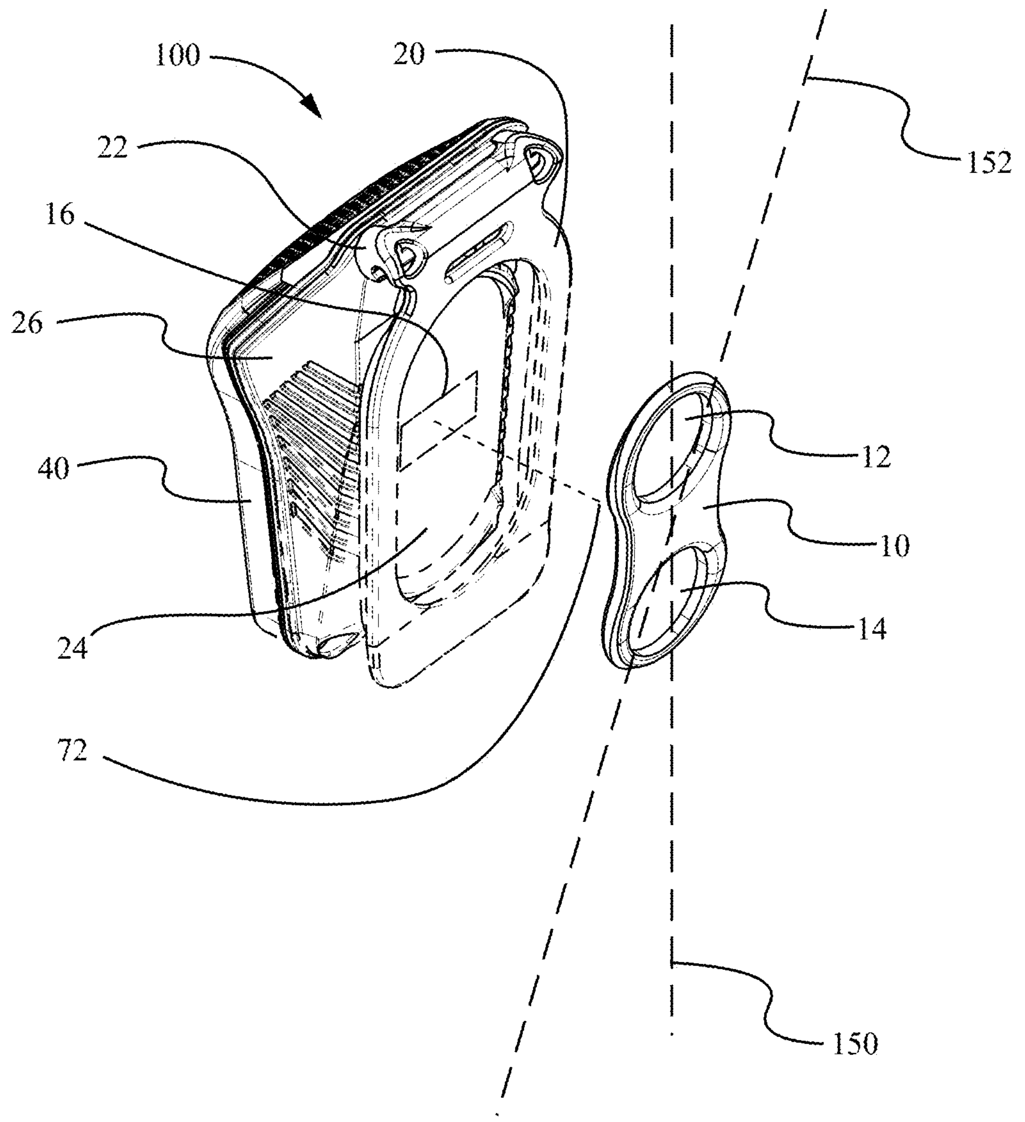
FIG. 28 diagrammatically illustrates different orientations of the removable member of the attachment device of the portable speaker of FIG. 1.

Initially, an illustrative embodiment of the attachment device 10, 20 will be described. While the attachment device 10, 20 is used for securing the portable speaker 100 in the illustrative embodiment, it is to be understood that the attachment device 10, 20 may be used for attaching any type of apparatus (e.g. an electric device such as a speaker, recorder, communicator, camera, microphone, etc. or a non-electronic device such as glasses, badge, etc.) to another object (e.g., an article of clothing, backpack, hat, etc.). Referring to FIGS. 3, 8, 9, and 24 of the illustrative embodiment, the attachment device 10, 20 generally comprises a clip member 20 (or standard clip 20) coupled to an apparatus (e.g., a portable speaker 100), the clip member 20 defining a clip cutout 24 in the clip member 20; a first magneto coupler 16 proximate to a surface of the apparatus, and not inside the apparatus housing, a location of the first magneto coupler 16 being at least partially within a boundary 138 defined by the clip cutout 24 of the clip member 20 (see FIG. 24); and a removable member 10 (or magnetic clip 10) having a second magneto coupler 18, the removable member 10 fitting within the boundary 138 defined by the clip cutout 24 of the clip member 20, and the second magneto coupler 18 of the removable member 10 being magnetically coupled to the first magneto coupler 16 of the apparatus. The clip member 20 accepts the edge 136 of an article (e.g. shirt collar, strap, belt, or hat) such that it holds the apparatus to the article (see FIG. 10). When the article is worn by an active user, the clip member 20 securely holds the apparatus to the article and thus the user. The clip can be made of any elastic material (e.g. plastic, metal, carbon fiber, etc.). The magneto coupler is one or more elements that generate a magnetic field (e.g. permanent magnet) or exhibit ferromagnetic behavior (e.g. attracts to permanent magnet). The magneto coupler could be a permanent magnet, a piece of steel, or a combination of magnetic and ferromagnetic material such that the combined materials more efficiently direct the magnetic field and flux to magnetically couple to another element (e.g., a permanent magnet located inside a cup made of ferromagnetic material). In the illustrative embodiment, the clip member 20 continues to function as a clip when the removable member 10 is magnetically coupled to the apparatus (e.g., as shown in FIG. 10). The ability for the clip member 20 to function (i.e. hold the device to a user) while the removable member 10 is magnetically coupled to the apparatus is advantageous as it makes the removable member easily accessible at any time and reduces the chance of the user losing the removable member 10 when not in use. Furthermore, the removable member 10 can magnetically couple to the housing in more than one orientation (see FIG. 28). The orientation being defined as rotation about the axis of magnetic coupling between magneto couplers and illustrated here as an angle relative to the long axis 150 of the removable member 10 (e.g., the acute angle defined between axes 150, 152 in FIG. 28). It is advantageous for the user to be able to couple the removable member 10 to the device in multiple orientations as it increases the case-of-use of the device and clip. For example, the illustrated removable member 10 is capable of being magnetically coupled at 0 and 180 degrees relative to its long axis 150.

Figure 24:
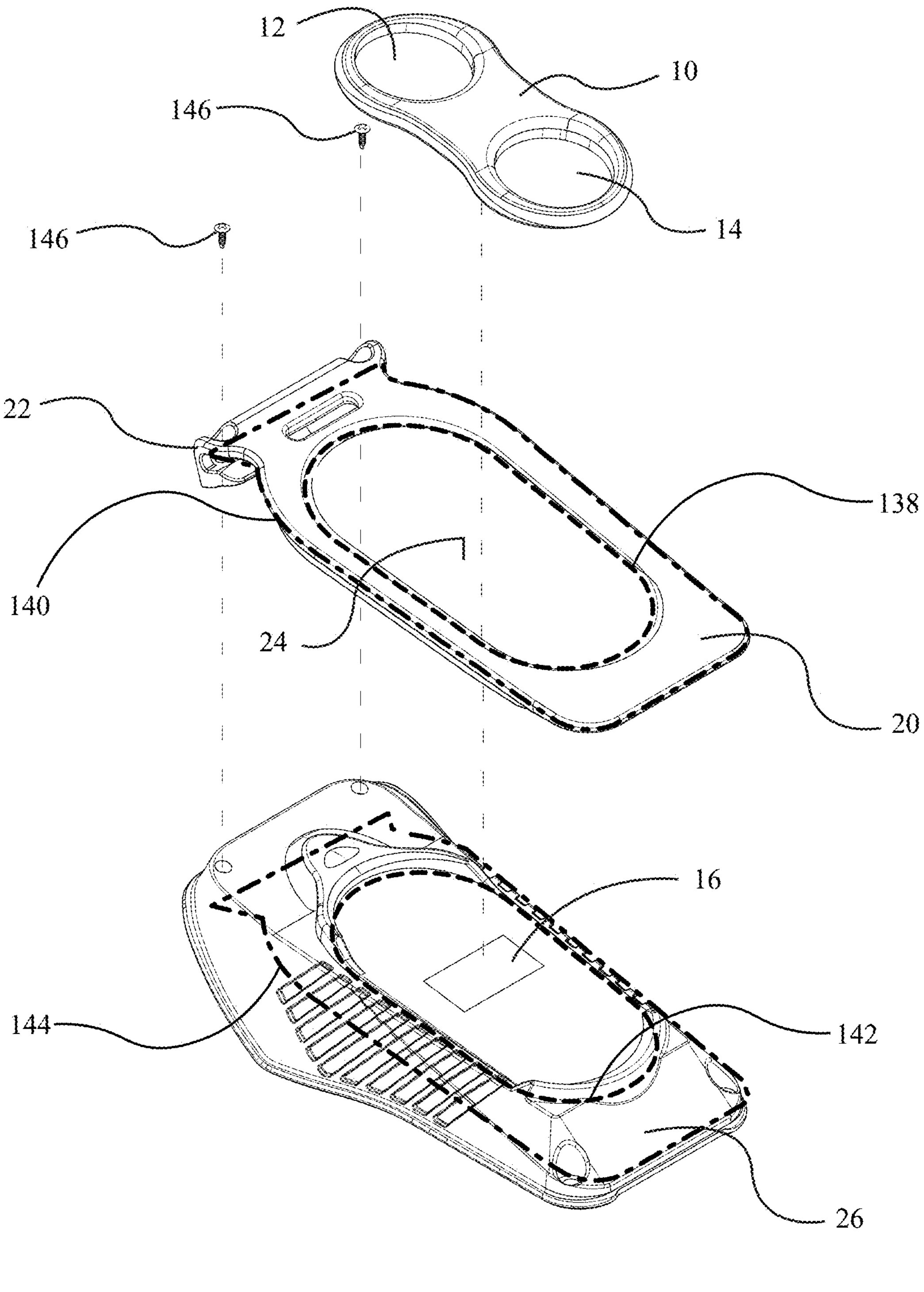
FIG. 24 is a partially exploded perspective view of the portable speaker of FIG. 1, where components of the attachment device are exploded from the housing of the portable speaker, and the inner and outer boundaries of the clip member of the attachment device are diagrammatically indicated using dashed lines.

With reference to FIG. 24, in the initial illustrative embodiment, the clip member 20 has the inner cutout boundary 138 and the outer clip boundary 140. In FIG. 24, the boundaries 138, 140 of the clip member 20 have been projected onto the housing 26, and the projected boundaries 142, 144 are diagrammatically illustrated in this figure. In the initial illustrative embodiment, the removable member 10 is disposed within clip boundaries 138, 140, but in other embodiments described hereinafter, all or a portion of the removable member 10 is disposed outside of the clip boundaries.

Figure 1:
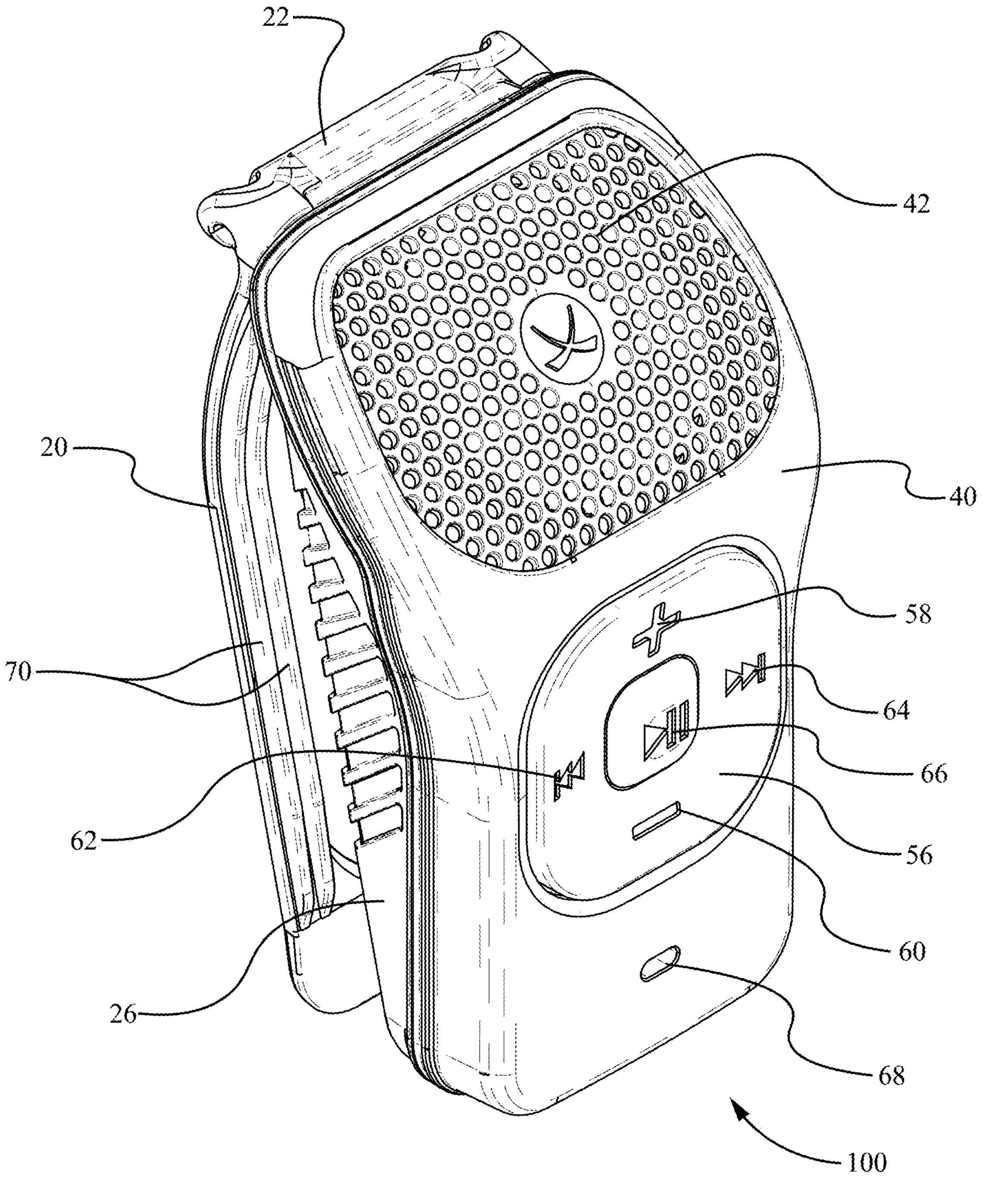
FIG. 1 is a frontal perspective view of a portable speaker, according to an illustrative embodiment of the invention.
Figure 2:
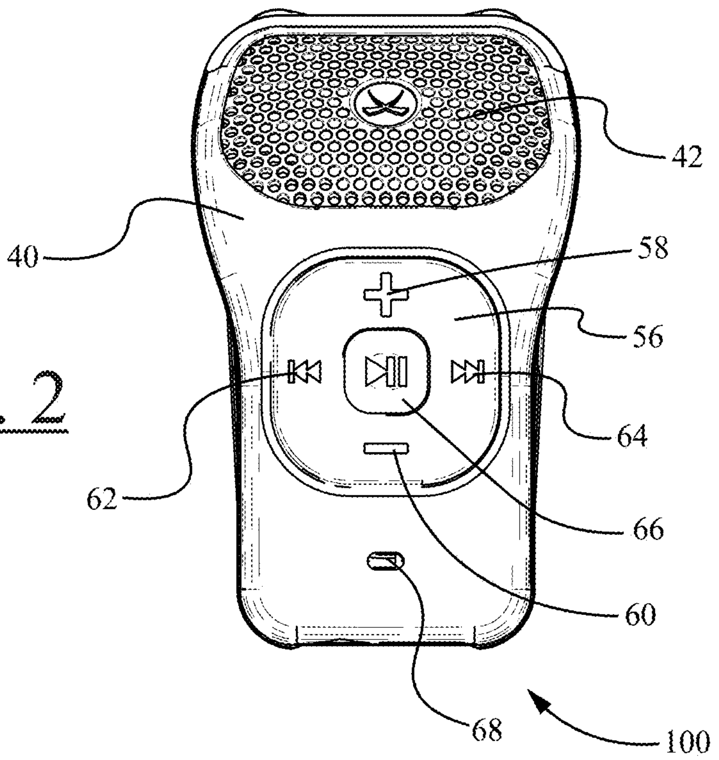
FIG. 2 is a front elevational view of the portable speaker of FIG. 1.
Figure 4:
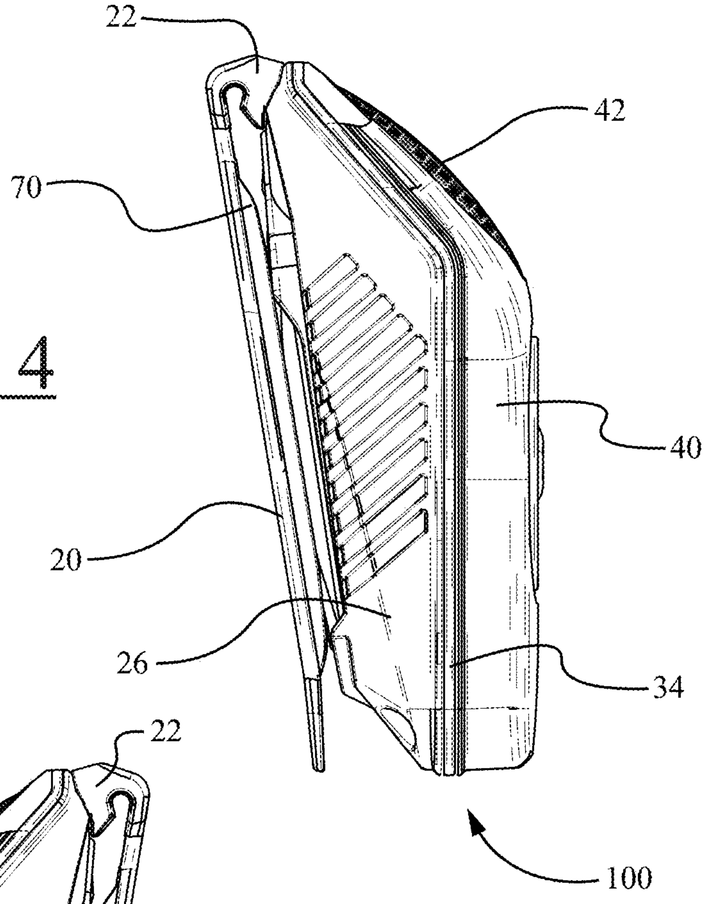
FIG. 4 is a first side elevational view of the portable speaker of FIG. 1.
Figure 9:
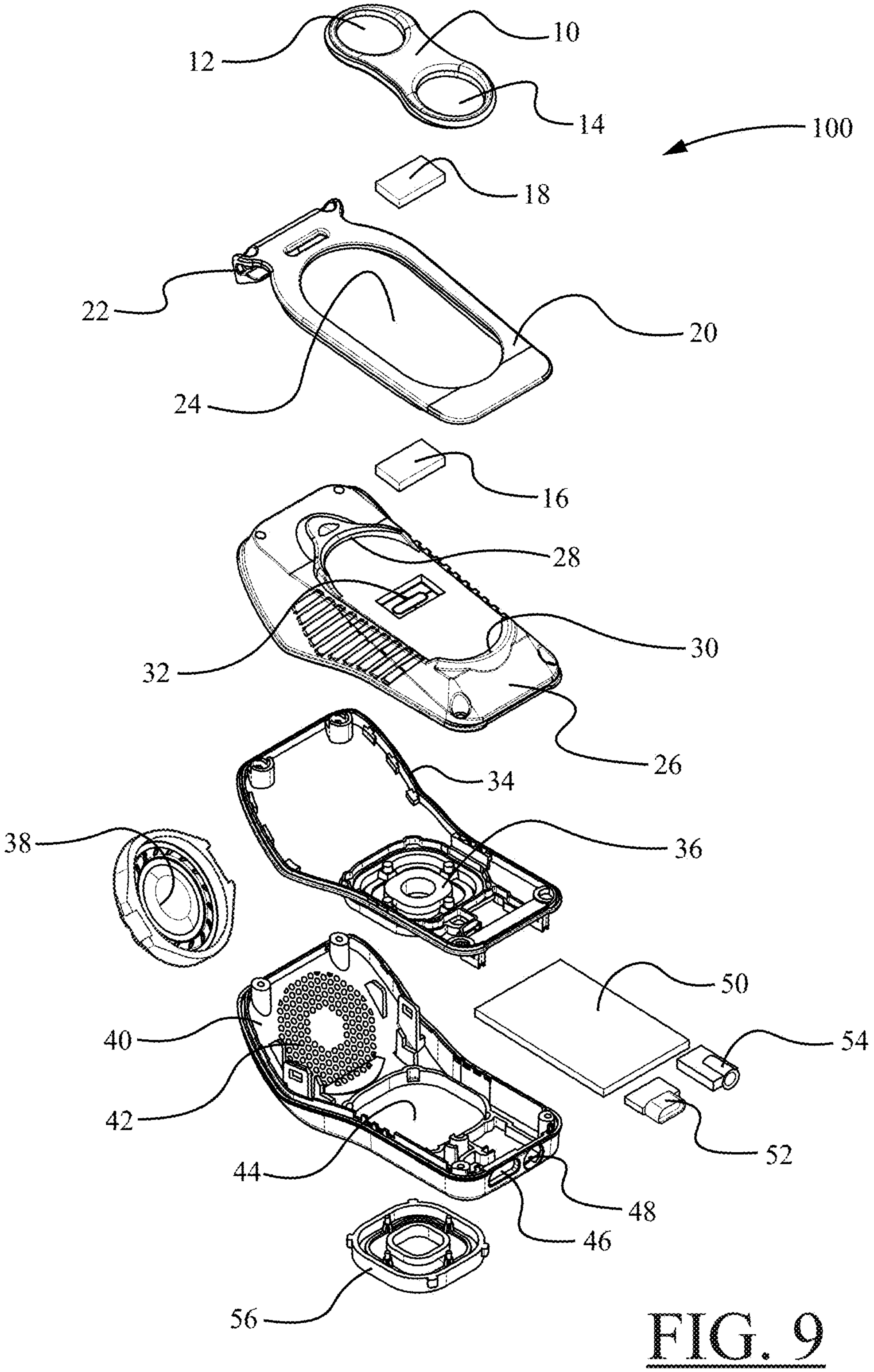
FIG. 9 is an exploded perspective view of the portable speaker of FIG. 1.
Figure 10:
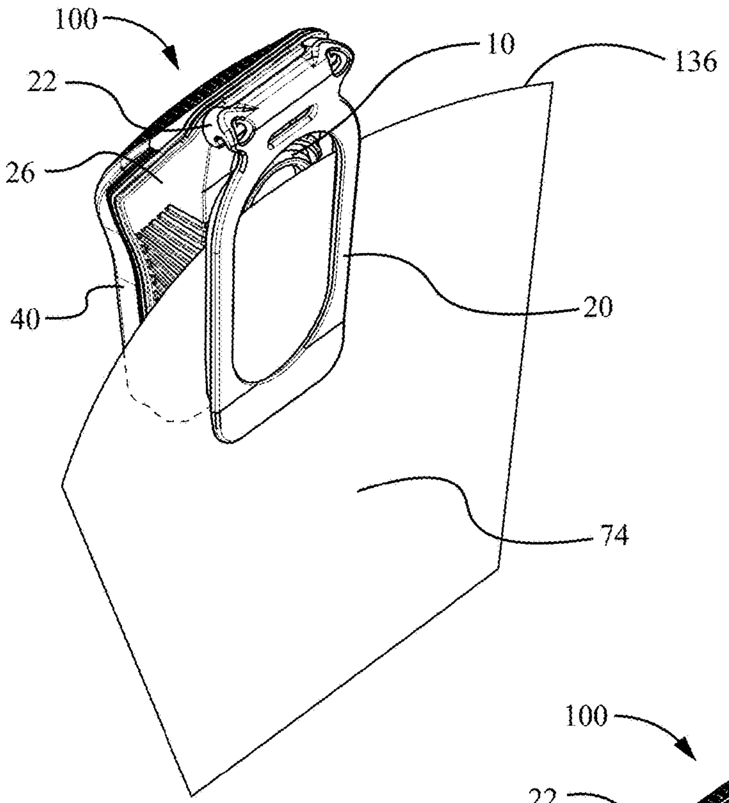
FIG. 10 illustrates a clip member of the portable speaker of FIG. 1 being used to attach the portable speaker to a piece of fabric.

In the illustrative embodiment, the clip member 20 is coupled to the apparatus via fasteners (e.g., screws 146 depicted in FIG. 24) or mechanical interlocks with material elasticity for allowing the clip to operate (refer to FIGS. 4 and 9). As shown in FIGS. 1 and 4, the clip member 20 has a hinge portion 22 about which the clip 20 is able to pivot. The clip member 20 can be designed so that it deflects when being attached (i.e. assembled) to the apparatus so the clip exerts a predetermined amount of pressure on the apparatus prior to a material being inserted between the clip and apparatus during use.

In one alternative embodiment, rather than being coupled to the apparatus using fasteners (i.e. screws, rivets, bolts, pins, etc.), the clip member 20 may be one continuous element formed with a part of the apparatus, and the clip member 20 has material elasticity to allow the clip to operate. In another alternative embodiment, the clip member 20 may be coupled to the apparatus by means of one or more mechanical interlock features (e.g. snap-fit, etc.). In another alternative embodiment, the clip member 20 may be coupled to the apparatus via an elastic adapter part that provides the deflection necessary for clip operation via a living hinge, clastic deformation, etc. In another alternative embodiment, the clip member 20 may be coupled to the apparatus by means of a spring element where the spring element assists the clip member 20 in operation. In another alternative embodiment, the clip member 20 may be coupled to the apparatus by means of a spring element and an adapter part where the spring is held by the clip and adapter and the adapter is attached to the apparatus via fasteners, mechanical interlocks, etc. In many cases, the spring, typically made of steel, is better suited to react the deflection, torque and stress of the clip in operation rather than the clip itself. The spring provides a more flexible and economic means of adjusting the resistance of the clip.

Figure 5:
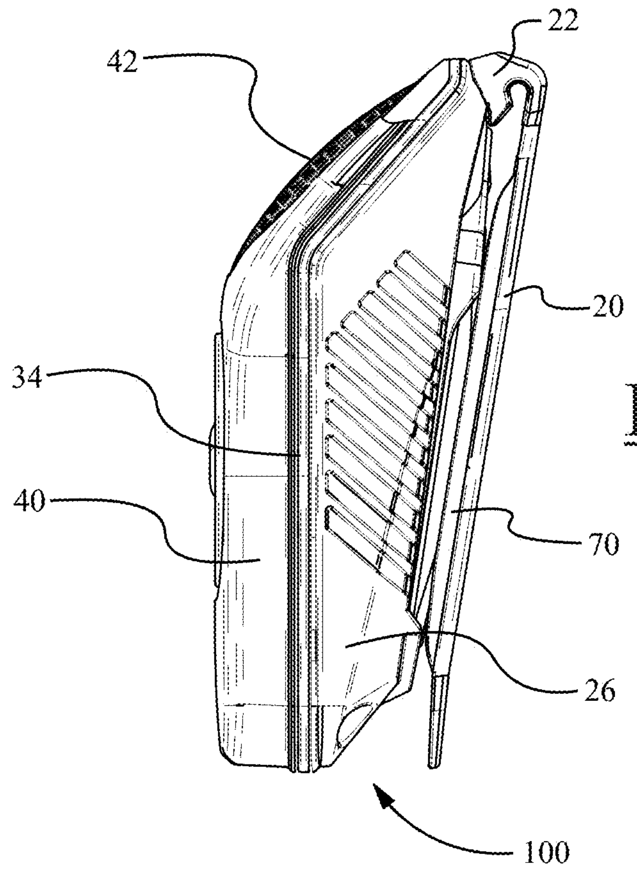
FIG. 5 is a second side elevational view of the portable speaker of FIG. 1.
Figure 6:
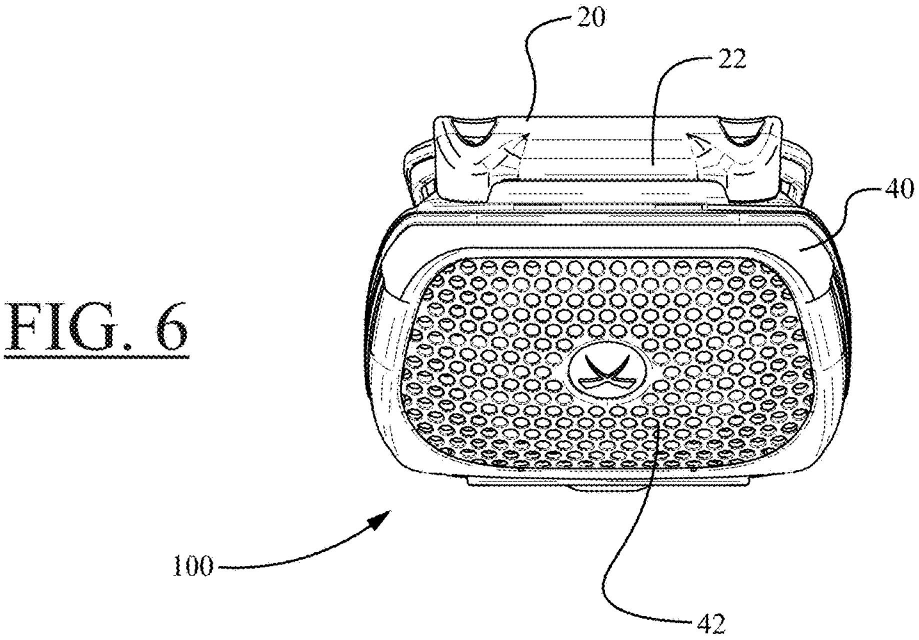
FIG. 6 is a first end view of the portable speaker of FIG. 1.
Figure 7:
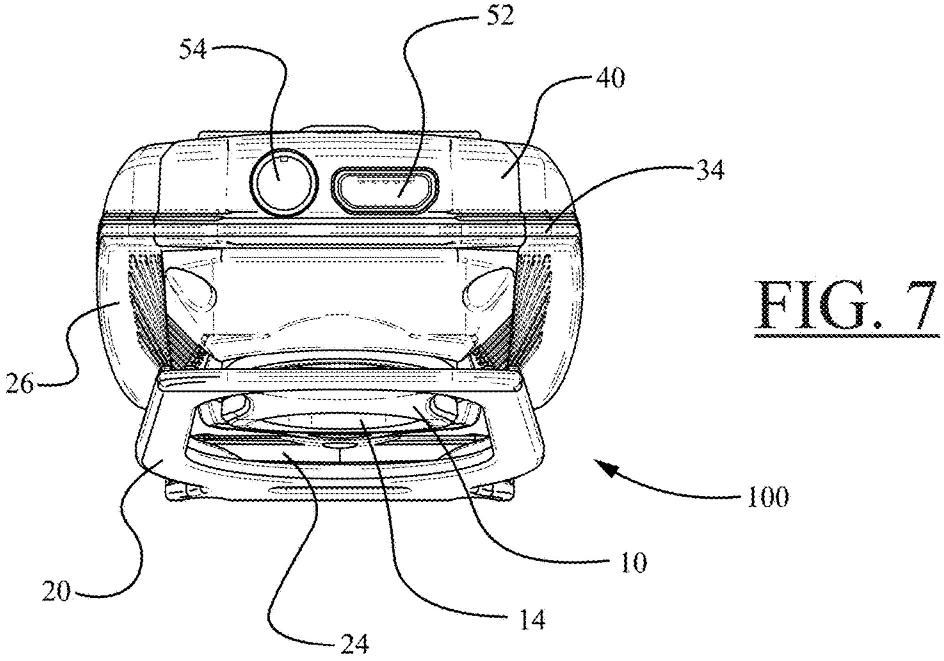
FIG. 7 is a second end view of the portable speaker of FIG. 1.

In the illustrative embodiment, with combined reference to FIGS. 1 and 5, the clip member 20 has ribs 70 along the length of the clip cutout 24 to increase the bending moment of inertia of the clip member 20, thereby allowing the stiffness of the clip member 20 to be generally unchanged with the clip cutout 24 and increasing surfaces for pinching material against a body of the apparatus.

Figure 3:
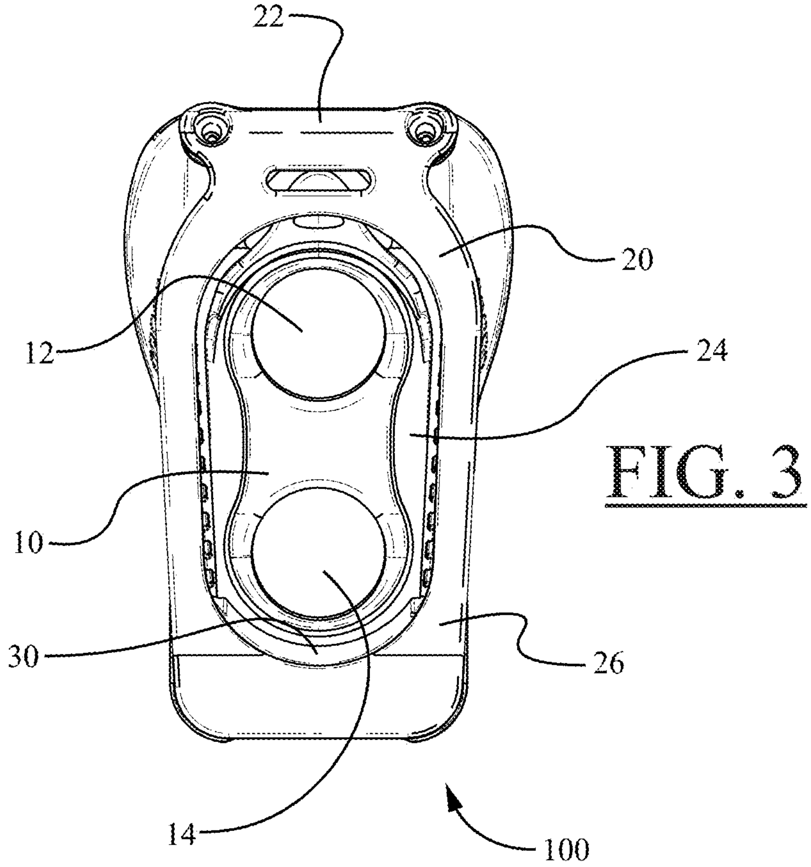
FIG. 3 is a rear elevational view of the portable speaker of FIG. 1, wherein an attachment device of the portable speaker is depicted.
Figure 8:
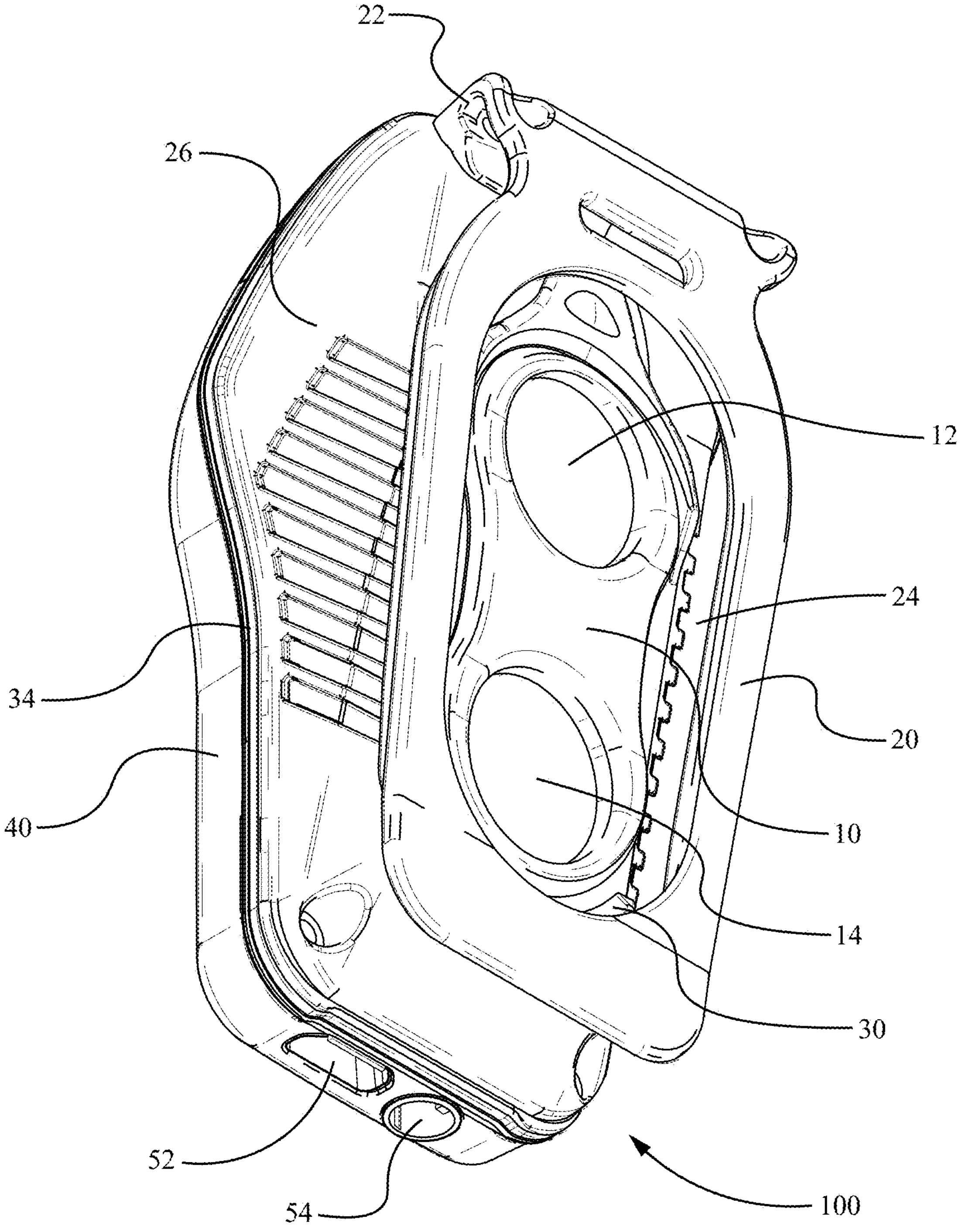
FIG. 8 is a rear perspective view of the portable speaker of FIG. 1.

In the illustrative embodiment, as shown in FIGS. 3, 8, and 9, the removable member 10 has a feature 12, 14 to assist in removing the removable member 10 from the apparatus when magnetically coupled thereto. More specifically, in the illustrative embodiment, the feature of the removable member 10 is one or more regions void of material (e.g., first and second finger cutouts 12, 14) that allow a finger of a user to anchor within the void 12, 14 and slide the removable member 10 along the apparatus in a direction that shears the first magneto coupler 16 from the magneto coupler magnet 18. For example, as shown in FIG. 15, a user may use the fingers of his or her hand 76 to slide the removable member 10 through the clip cutout 24 of the clip member 20 (as diagrammatically indicated by the arrow 78 in FIG. 15) to shear the first magneto coupler 16 from the second magneto coupler 18, and to remove the removable member 10 from the apparatus 100.

In one alternative embodiment, rather than the feature being a finger cutout 12, 14, the feature of the removable member 10 may be a positive feature that allows a finger of a user to anchor on the positive feature and slide the removable member 10 along the apparatus in a direction that shears the first magneto coupler 16 from the second magneto coupler 18. In another alternative embodiment, the feature of the removable member 10 may be a negative recessed feature that allows a finger of a user to anchor within the negative recessed feature and to slide the removable member 10 along the apparatus in a direction that shears the first magneto coupler 16 from the second magneto coupler 18.

Figure 15:
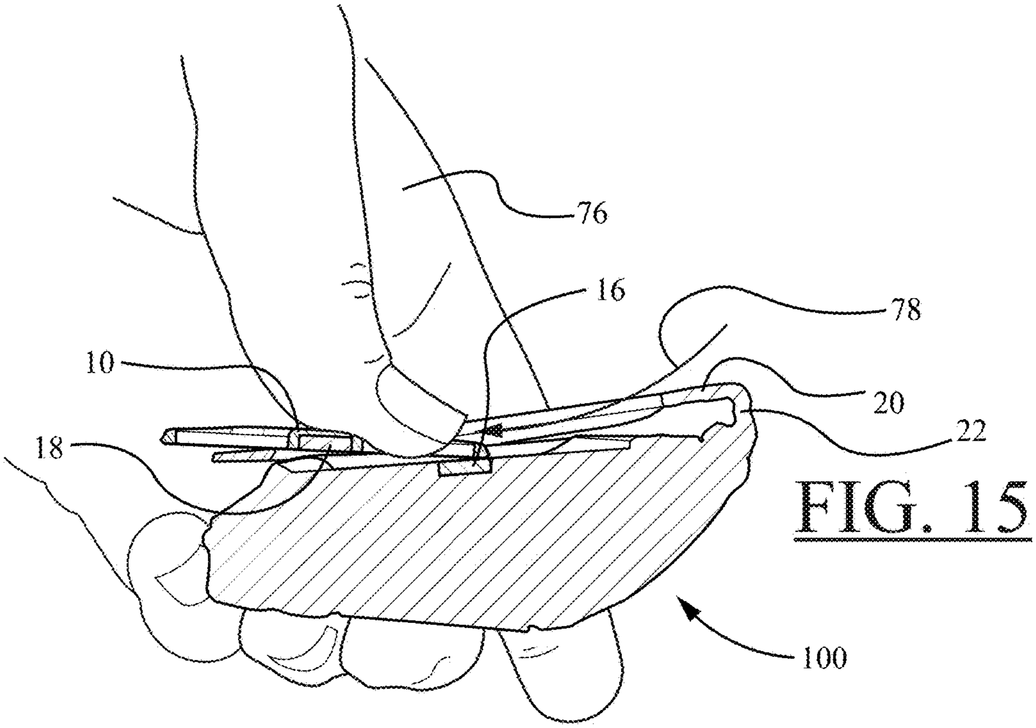
FIG. 15 is another longitudinal sectional view illustrating the manner in which a user disengages the removable member from the remainder of the portable speaker of FIG. 1.

In the illustrative embodiment, with reference to FIGS. 8, 9, and 15, the apparatus has a feature that assists in removing the removable member 10 from the apparatus while the removable member 10 is being removed by transitioning the removable member along a body of the apparatus. More specifically, in the illustrative embodiment, the feature of the apparatus is a positive ramp-like feature 30 that directs the removable member 10 so that the removable member 10 is able to be removed from within the clip cutout 24 in the clip member 20 while the removable member 10 is being transitioned along the body of the apparatus as the removable member 10 is being removed from the apparatus (see FIG. 15).

In one alternative embodiment, rather than the feature being a positive ramp-like feature 30, the feature of the apparatus may be a negative ramp-like feature that directs the removable member 10 so that the removable member 10 slides between the clip member 20 and the apparatus.

Figure 13:
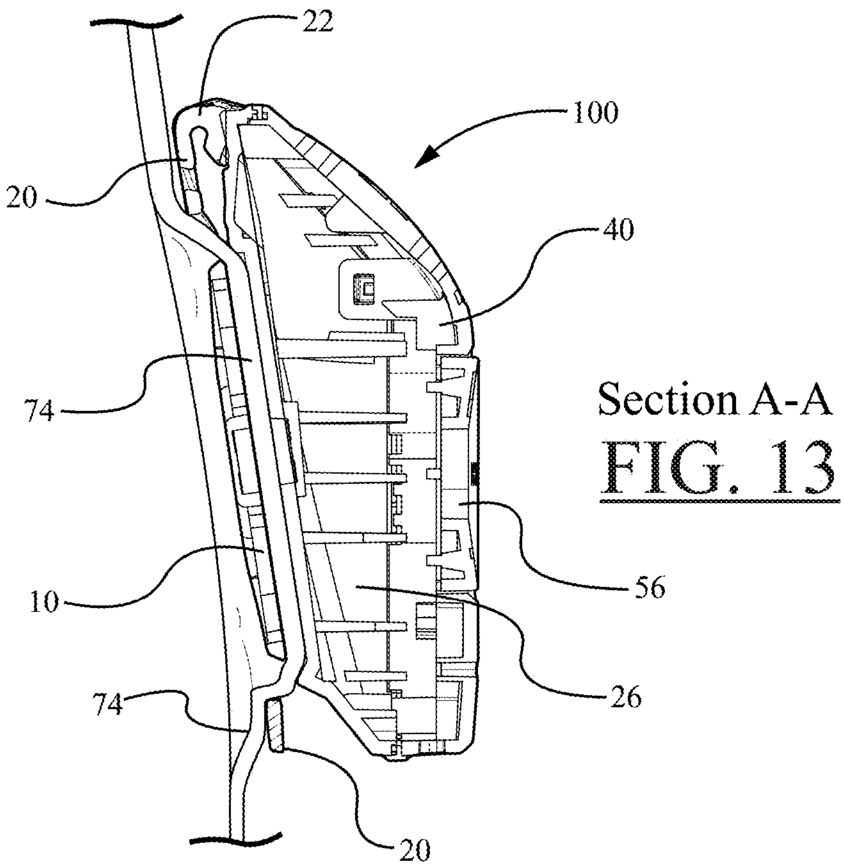
FIG. 13 is a longitudinal sectional view cut through the portable speaker and fabric of FIG. 11B, wherein the section is generally cut along the cutting-plane line A-A in FIG. 11B.
Figure 14:
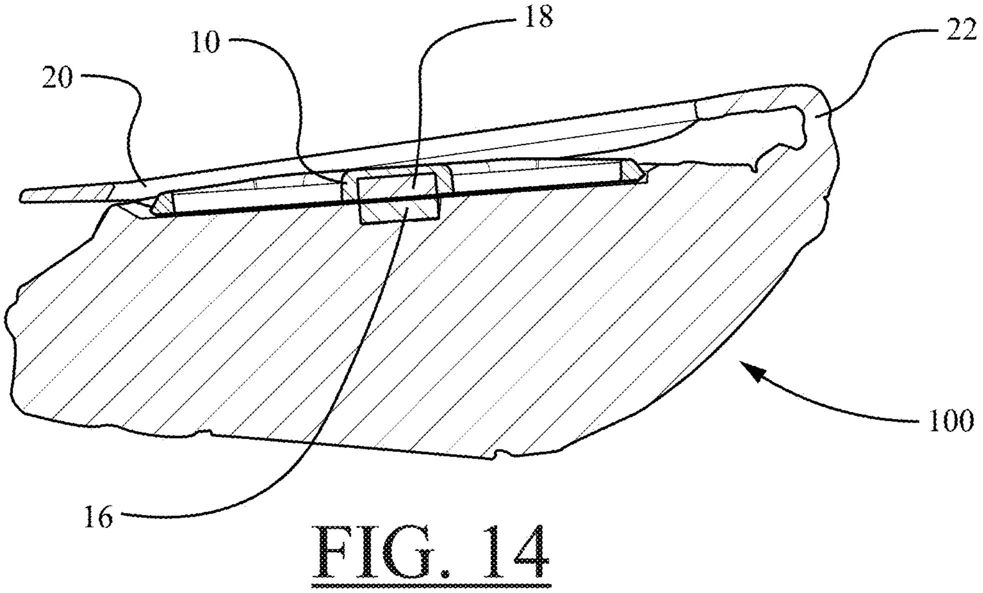
FIG. 14 is a longitudinal sectional view cut through the attachment device of the portable speaker of FIG. 1.

In the illustrative embodiment, referring to FIGS. 9 and 13, the surface of the apparatus comprises a raised element (on rear housing 26), and the removable member 10 is held in contact with the raised element via a shear centering force developed between the first magneto coupler 16 and the second magneto coupler 18 such that, when a passive material (e.g., piece of fabric 74 in FIG. 13) is placed between the apparatus and the removable member 10, a location of high friction is created with the passive material so as to result in a pinch point 28 (see FIGS. 9 and 13). In the illustrative embodiment, the surface of the apparatus (e.g., the surface of the rear housing portion 26) comprises a recess 32 for accommodating the first magneto coupler 16 in a generally flush position relative to the outer surface of the rear housing portion 26 (refer to FIGS. 9 and 13).

Figure 11A:
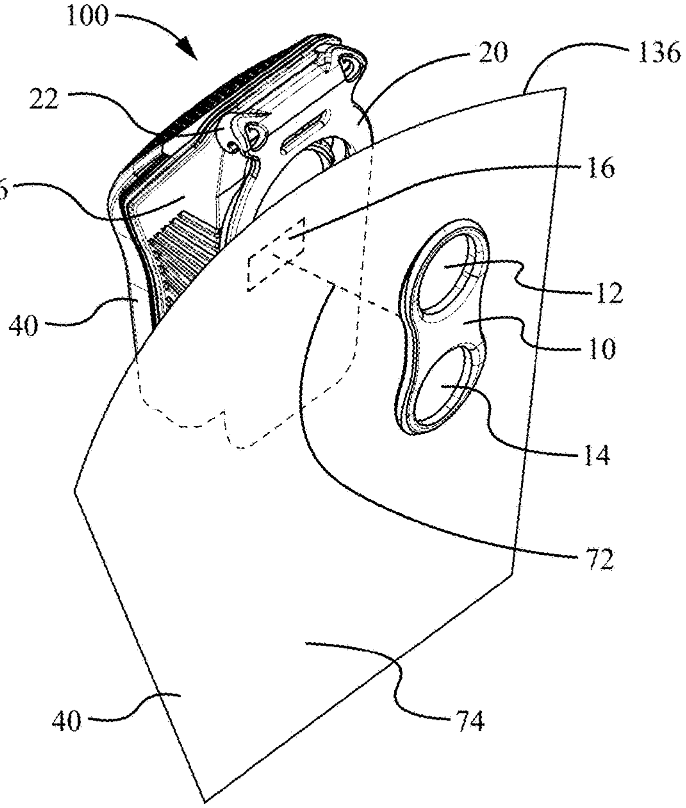
FIG. 11A illustrates a removable member of the portable speaker of FIG. 1 being engaged with the remainder of the portable speaker.
Figure 11B:
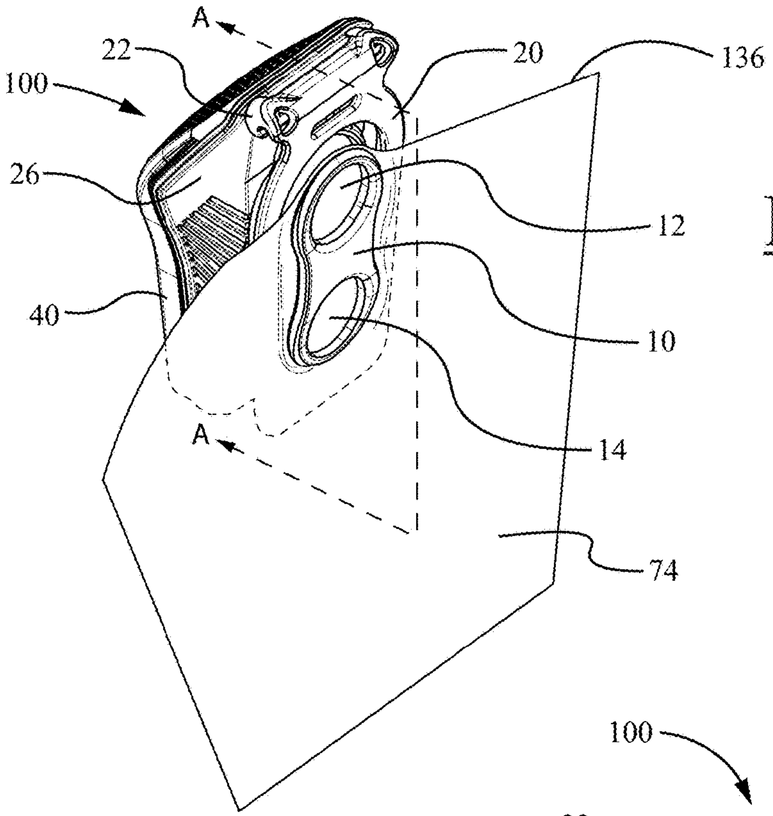
FIG. 11B illustrates the removable member of the portable speaker of FIG. 1 being used to attach the portable speaker to a piece of fabric, wherein the piece of fabric passes over the clip member of the portable speaker.

As shown in FIG. 9, in the illustrative embodiment, the first and second magneto couplers 16, 18 are rectangular magnets magnetized through their thickness and are capable of automatically aligning along their long and short axes, and the first and second rectangular magnets 16, 18 have a superior shear centering force along the short axes. In the illustrative embodiment, the first and second rectangular magnets 16, 18 have their short axes coincidental with the direction of gravity when the apparatus is worn on a shirt (see e.g., FIGS. 11A and 13). Also, in the illustrative embodiment, the first and second rectangular magnets 16, 18 have their short axes providing the shear centering force towards the pinch point 28 (see FIGS. 9 and 13). As shown in FIG. 11A, the attachment device may be used with a piece of fabric 74 sandwiched between the outer surface of the clip member 20 and the removable member 10. In FIG. 11A, the magnetic line of attraction between the magnets 16, 18 is diagrammatically represented by the dashed line 72.

Figure 17:
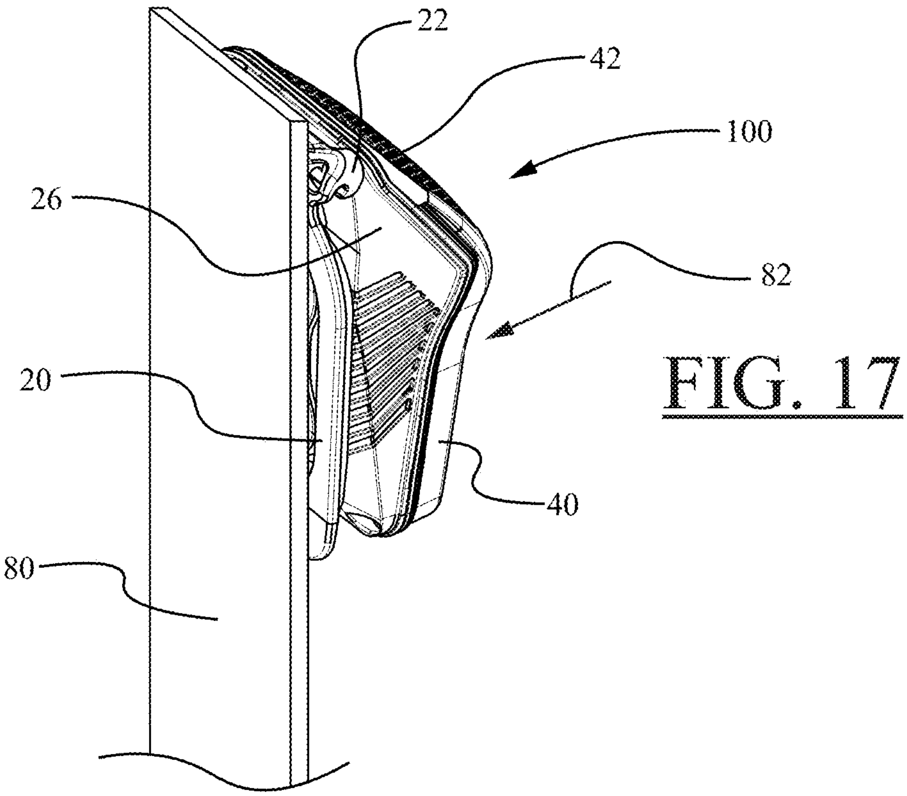
FIG. 17 is a side perspective view of the portable speaker of FIG. 1 attached to a metallic surface by means of the attachment device of the portable speaker.

In the illustrative embodiment, the removable member 10 is independently symmetric about its long and short axes such that, when the first and second rectangular magnets 16, 18 automatically align in one of two possible orientations that are 180 degrees apart, the appearance and function of the removable member 10 remains unchanged. Also, in the illustrative embodiment, the second magnet 18 is disposed in or on the removable member 10 sufficiently close enough to magnetically couple to a third ferromagnetic material (e.g., a metal surface 80 depicted in FIG. 17), distal to the apparatus, while the removable member 10 is also magnetically coupled to the apparatus. In FIG. 17, the direction of attachment to the metal surface 80 is diagrammatically represented by the arrow 82. In one or more embodiments, the first and second magneto couplers 16, 18 are specifically designed to allow maximum flux from the magnetic elements so as to permit mounting the device to a third ferromagnetic surface without requiring the removable member 10 to be removed from the device.

In an alternative embodiment, the first and second magneto couplers 16, 18 are in the form of programmed correlated magnets that are programmed to auto align the removable member 10 on the apparatus so as to provide a maximal shear clamping force between the removable member 10 and a pinch point 28 of material, and to provide minimal resistive force to being removed by a user. Also, in one or more embodiments, the first magneto coupler 16, the second magneto coupler 18, or both the first and second magneto couplers 16, 18 are surrounded on at least three sides by a ferromagnetic material so as to direct and concentrate the magnetic field and flux path between the first and/or second magneto couplers 16, 18 and potentially reduce overall weight of the apparatus.

In one alternative embodiment, rather than being rectangular magnets, the first and second magneto couplers are axially magnetized circular magnets that generate a strong shear centering force. In this alternative embodiment, the removable member 10 is symmetric about the center of the second circular magnet.

In another alternative embodiment, the first magneto coupler 16 is a ferromagnetic material and the second magneto coupler 18 is a permanent magnet. In yet another alternative embodiment, the second magneto coupler 18 is a ferromagnetic material and the first magneto coupler 16 is a permanent magnet.

Figure 12:
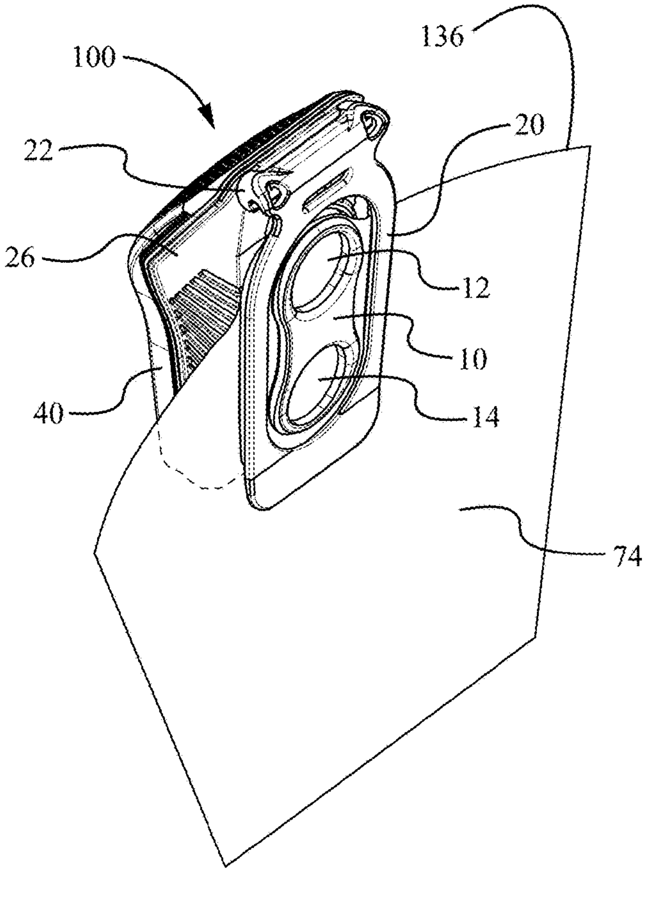
FIG. 12 illustrates the removable member of the portable speaker of FIG. 1 being used to attach the portable speaker to a piece of fabric, wherein the piece of fabric passes under the clip member of the portable speaker.

Advantageously, the attachment device 10, 20 described above has the advantages of both a standard clip (i.e., securing a device to the edge 136 of an article of clothing, belt, strap, etc.—see FIG. 10) and a magnetic clip (i.e., securing a device to a non-edged article of clothing, accessory strap, etc.—see FIG. 11A). Moreover, the magnetic clip 10 is able to remain on the device when the attachment device 10, 20 is operated as a standard clip (see FIG. 10), and when a magnet on the device is used for securing the device to another ferromagnetic surface (see FIG. 17). Furthermore, the attachment device 10, 20 is minimal in size and weight, and has no more weight or size than a device tasked with performing as only a magnetic clip or standard clip. In addition, the attachment device 10, 20 is capable of double securing in standard clip mode by use of the magnetic clip 10 in addition to the standard clip 20 (see FIG. 12). The standard clip 20 is small and light but maintains appropriate stiffness because of the ribs 70 described above. The high friction pinch point 28 between the speaker body and the magnet clip 10 grab the shirt or other garment in a manner that is far superior at holding the device versus just sandwiching the shirt between two magnets. As described above, the magnetic clip 10 has an auto centering feature that not only provides additional shear holding force at the pinch point 28, but also auto aligns the magnetic clip 10 inside the users shirt without the user having to align it in a fully manual fashion. In addition, the magnetic clip 10 is easy to remove because of the finger cutouts 12, 14 and the positive ramp feature 30 on the speaker body that directs it out of the clip member 20 as it slides off.

Now, with reference to FIGS. 22A-22C, a first alternative embodiment of an attachment device will be explained. As shown in these figures, the alternative embodiment of the attachment device comprises a first magneto coupler 122 disposed on, or proximate to a surface of an apparatus 130; and a clip member 120 having a second magneto coupler 124, the second magneto coupler 124 disposed on, or proximate to a surface of the clip member 120. In this alternative embodiment, the first magneto coupler 122 and the second magneto coupler 124 magnetically attract so that the clip member 120 and the apparatus 130 together form a clipping device that is structurally and functionally similar to a standard clip. A clipping device being structurally similar to a clip member 10 (standard clip) with an open end that receives the edge of an item (i.e. shirt collar, strap, etc.) and a closed end that holds against the item to restrict motion and thus secure the device to the user. The clipping device has all of the advantages and functions of a standard clip, but because the primary mechanism of attachment is the magneto couplers, it can also be quickly detached from the device and used as a magnetic clip. As such it also has all the advantages and functions of a magnetic clip.

Figure 22A:
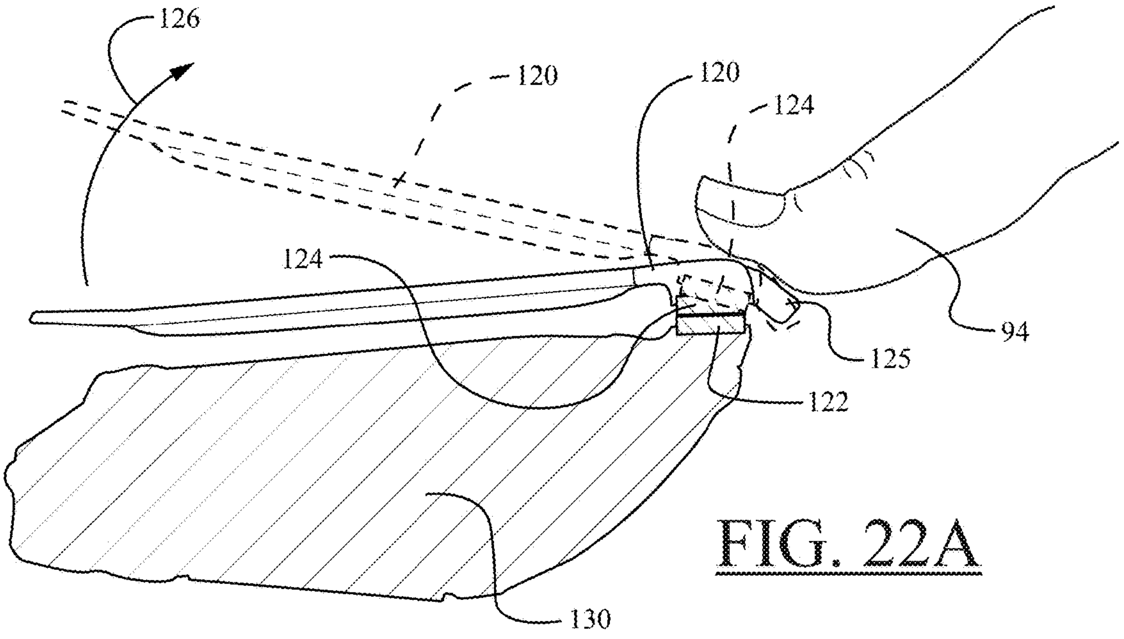
FIG. 22A is a side view illustrating another type of attachment device, according to an alternative embodiment of the invention, wherein the clip member of the attachment device is shown being rotated in a upward direction so that it is able to be attached to a piece of fabric.
Figure 22B:
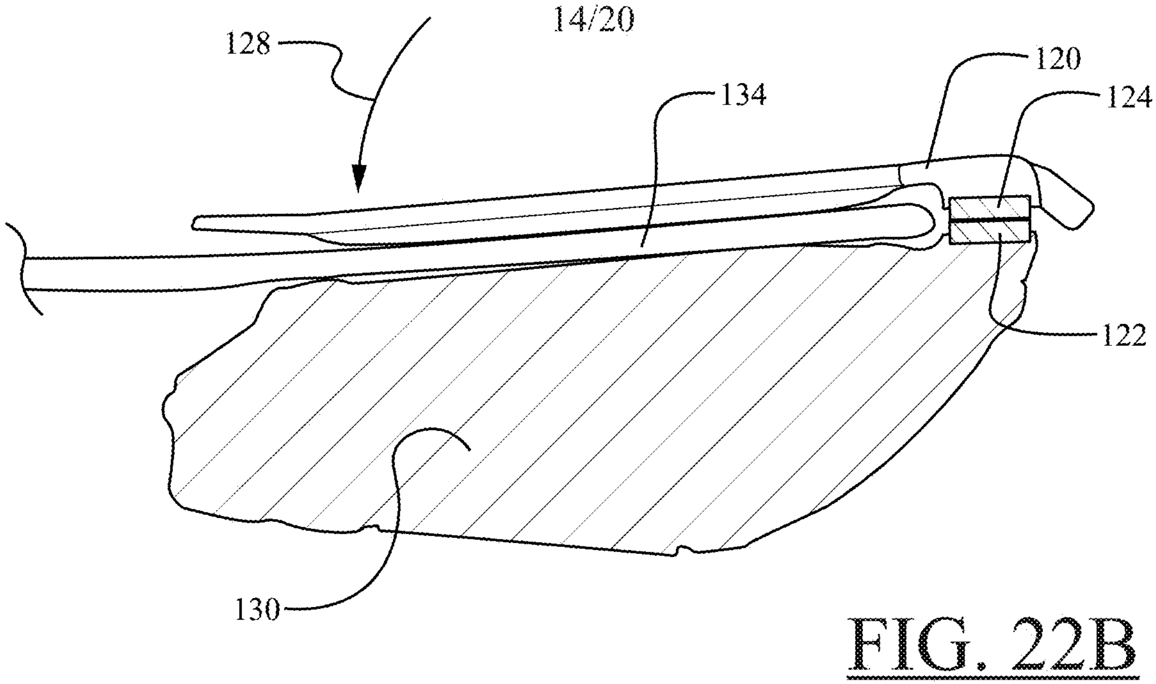
FIG. 22B is another side view of the attachment device of FIG. 22A, wherein the clip member of the attachment device has been rotated downwardly to its engaged position with the piece of fabric.
Figure 22C:
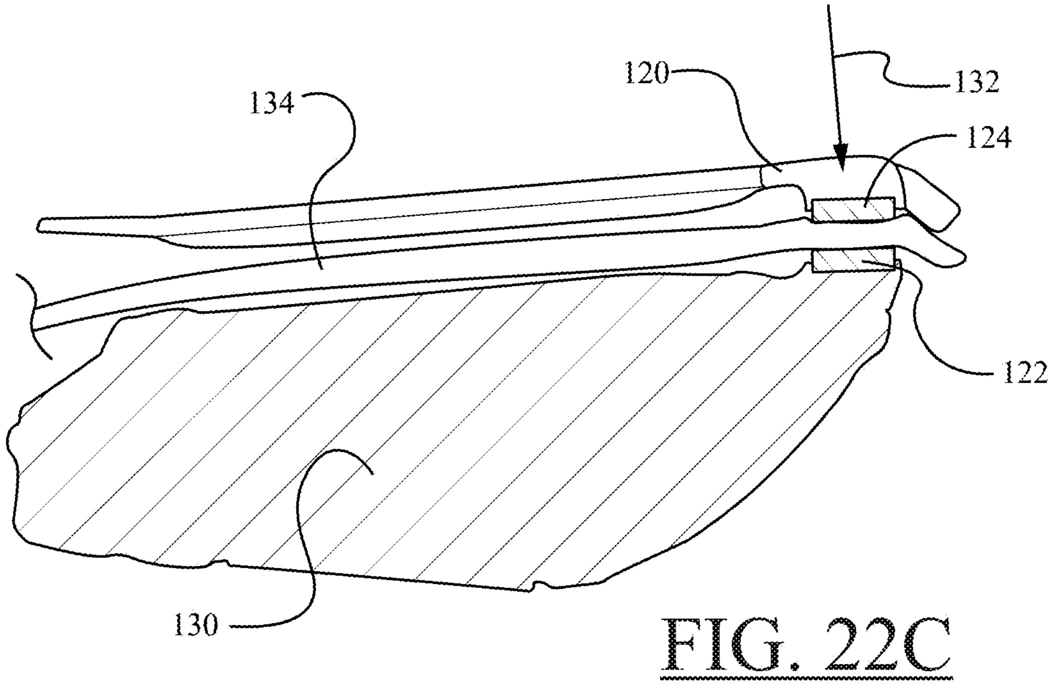
FIG. 22C is yet another side view of the attachment device of FIG. 22A, wherein the piece of fabric is shown being sandwiched between the magnets of the attachment device.

In the alternative embodiment of FIGS. 22A-22C, the first and second magneto couplers 122, 124 are in the form of programmed correlated magnets that are programmed to auto align the clip member 120 on the apparatus 130. Also, in the alternative embodiment, the first and second programmed correlated magnets are programmed to provide a spring-like restorative force (e.g. reactive torque is a function of angular displacement) when the clip member 120 is rotated open about the contact point of the first and second magnets. The advantage is replicating the feel and function of a traditional torsion spring clip-a design that has a proven history of good performance-solely with the clip member 120 and without adding the additional elements typically required in this design (e.g. spring, pin), thus reducing cost complexity and weight.

Turning again to FIG. 22A, in the alternative embodiment, the clip member 120 has a rigid element 125 on one side of the second magneto coupler 124 so as to facilitate a user applying pressure at that location (e.g., pressure applied by the finger 94 of the user in FIG. 22A), towards the apparatus 130, which rotates the clip member 120 into an open position (as diagrammatically indicated by upward curved arrow 126 in FIG. 22A) to accept material (e.g., a piece of fabric 134—see FIGS. 22B and 22C) for clipping. In FIG. 22B, the downward curved arrow 128 diagrammatically represents the closing of the clip member 120 onto the piece of fabric 134. In FIG. 22C, the straight downward arrow 132 diagrammatically represents the sandwiching of the piece of fabric 134 between the first and second magneto couplers 122, 124 by displacing the second magneto coupler 124 in a generally straight direction towards the first magnet 122.

Also, in the alternative embodiment of FIGS. 22A-22C, the clip member 120 may have a feature with a shape that is semi-perpendicular to the plane of the clip member 120, thus enabling a user to be able to more easily press on the clip member 120 so as to deflect the clip member open to accept material and to create friction when operating as a magnetic clip 120 with material being diverted around the feature.

Next, with reference to FIGS. 23A and 23B, a second alternative embodiment of an attachment device will be explained. As shown in these figures, the alternative embodiment of the attachment device comprises a clip 220 coupled to an apparatus 230, the clip 220 having a first magneto coupler 216 disposed in or on clip 220; and a removable member 210 having a second magneto coupler 218, the second magneto coupler 218 of the removable member 210 being magnetically attracted to the first magneto coupler 216 of the clip 220.

Similar to the clip 20 described above, the clip 220 of the alternative embodiment has a hinge portion 222 about which the clip 220 is able to pivot. Also, in the alternative embodiment of FIGS. 23A and 23B, the clip 220 may be provided with a recess 226 for accommodating the recessed mounting of the removable member 210. In one or more embodiments, the clip 220 may be coupled to the apparatus 230 with a spring member, mechanical interlocks, or fasteners.

Figure 23A:
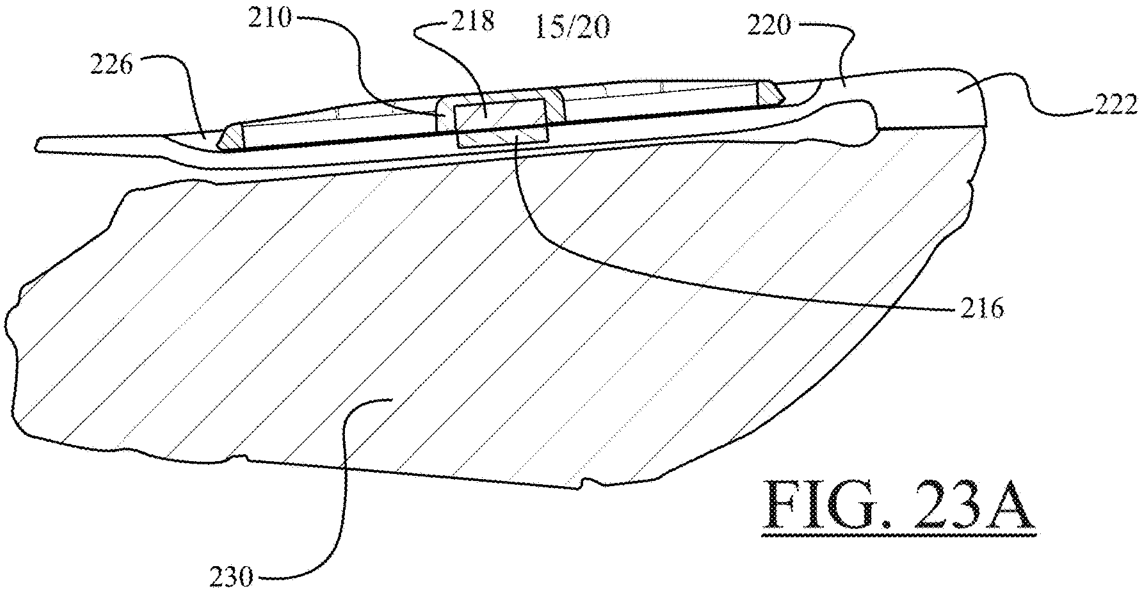
FIG. 23A is a side view illustrating another type of attachment device, according to another alternative embodiment of the invention, wherein the removable member is designed to be secured to the clip member of the attachment device, rather than the portable speaker housing.
Figure 23B:
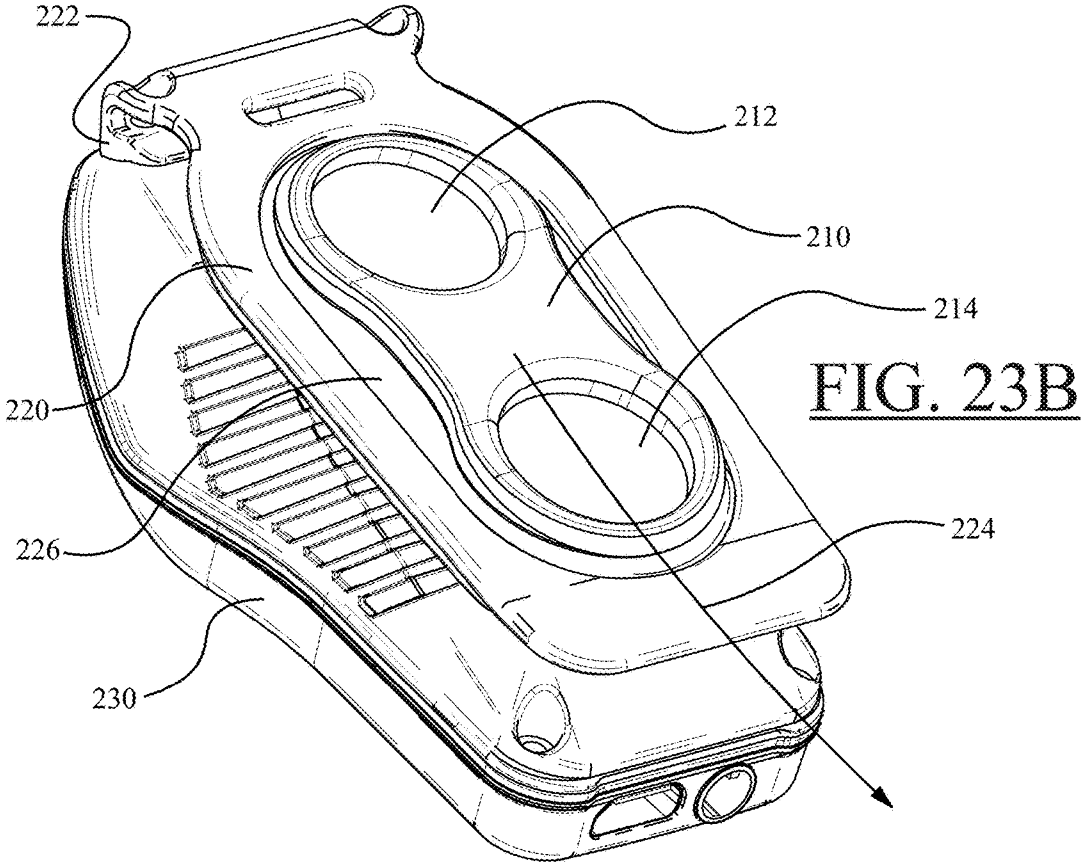
FIG. 23B is a rear perspective view of the attachment device of FIG. 23A on a portable speaker similar to the portable speaker of FIG. 1.

In the alternative embodiment, as shown in FIGS. 23A and 23B, the removable member 210 has a feature 212, 214 to assist in removing the removable member 210 from the clip 220 when magnetically coupled thereto. More specifically, in the alternative embodiment, the removable member 210 comprises one or more regions void of material (e.g., first and second finger cutouts 212, 214) so that the removable member 210 is able to be easily removed from the clip 220 by a finger of a user by sliding the removable member 210 along the clip 220 in a direction that shears the first magneto coupler 216 from the second magneto coupler 218 (e.g., as diagrammatically represented by the arrow 224 in FIG. 23B). Also, in one or more embodiments, the removable member 210 may be oversized in at least one dimension relative to the clip 220 so that a portion of the removable member 210 is exposed and the removable member 210 is able to be easily removed from the clip 220 by a finger of a user.

Figure 18:
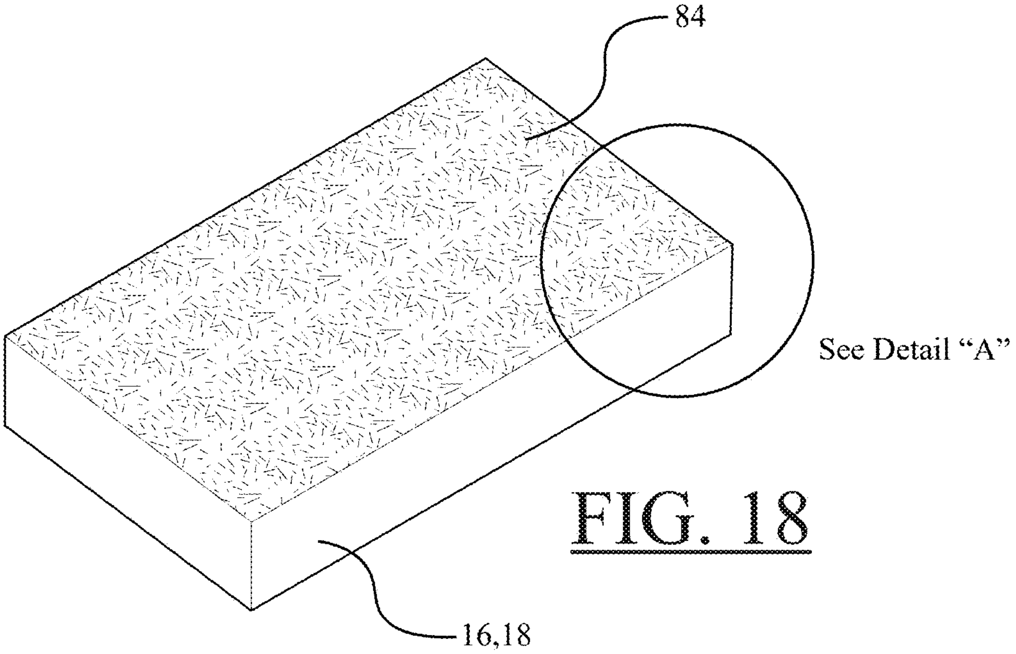
FIG. 18 is a perspective view of a magnet of the portable speaker of FIG. 1, wherein the etched surface of the magnet is illustrated.

In the embodiments of the attachment devices explained above, at least one of the first magneto coupler 16, 122, 216 and the second magneto coupler 18, 124, 218 has an etched surface 84 (see e.g., FIG. 18) to facilitate a bonding of the at least one of the first magneto coupler 16, 122, 216 and the second magneto coupler 18, 124, 218 to the clip 20, 220 or the removable member 10, 210 using an adhesive 86 (see e.g., FIG. 19).

Figure 25:
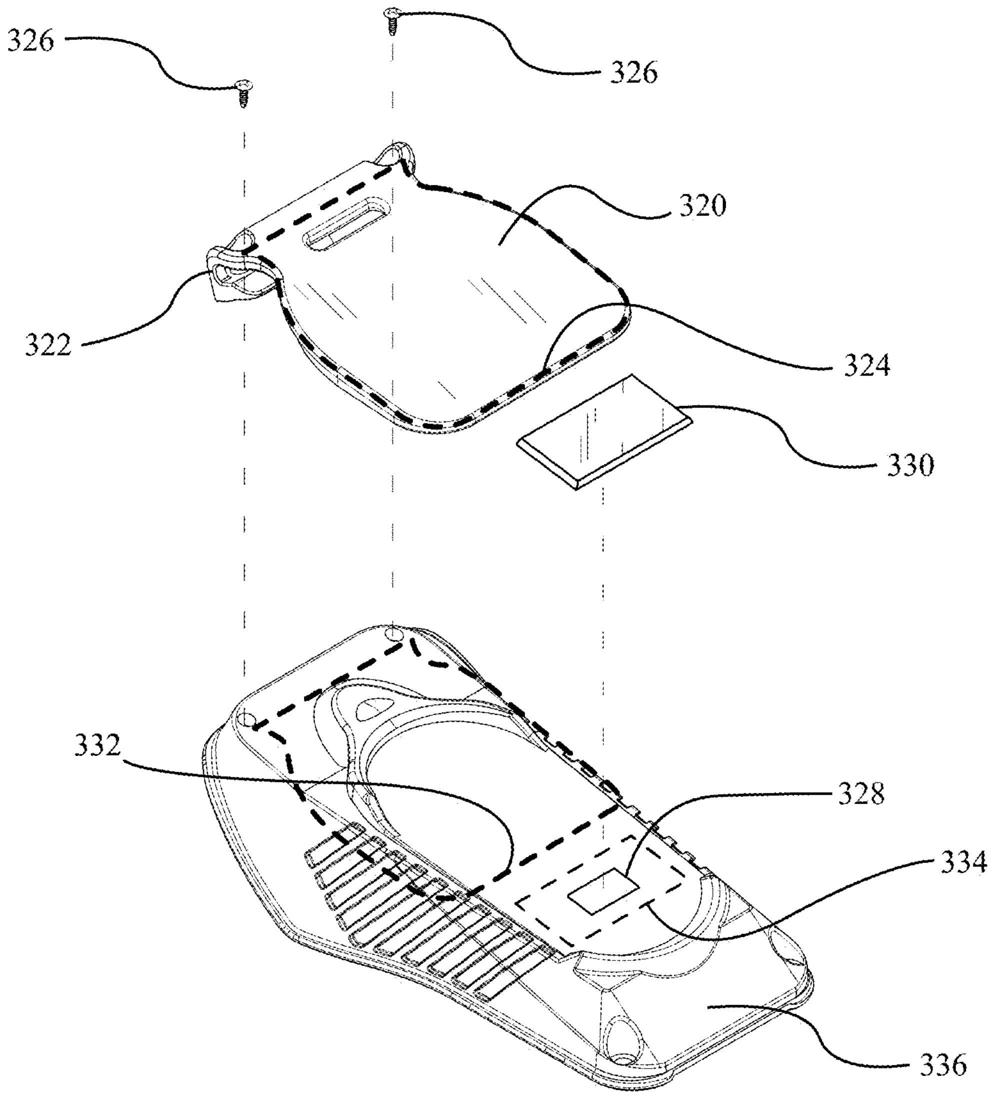
FIG. 25 is a partially exploded perspective view illustrating yet another type of attachment device, according to yet another alternative embodiment of the invention, wherein a removable member of the attachment device is located outside the boundary of a clip member.

Now, with reference to FIG. 25, a third alternative embodiment of an attachment device will be explained. As shown in this figure, the alternative embodiment of the attachment device comprises a clip member 320 coupled to housing portion 336 of an electronic device via fasteners (e.g., screws 326). Similar to the clip member 20 described above, the clip 320 of the alternative embodiment has a hinge portion 322 about which the clip member 320 is able to pivot. Although, unlike the embodiment of FIGS. 1-21 described above, the clip member 320 does not contain a cutout for accommodating the removable member 330. Rather, as shown in FIG. 25, the removable member 330 is disposed completely outside the boundary 324 of the clip member 320, and thus outside the projected boundary 332 of the clip member 20 illustrated in FIG. 25. In the embodiment of FIG. 25, the attachment device comprises a first magneto coupler 328, which is recessed mounted in the housing portion 336, and a second magneto coupler disposed on or in the removable member 330. The projected boundary 334 of the removable member 330 is illustrated in FIG. 25, which lies completely outside of the projected boundary 332 of the clip member 320.

Figure 26:
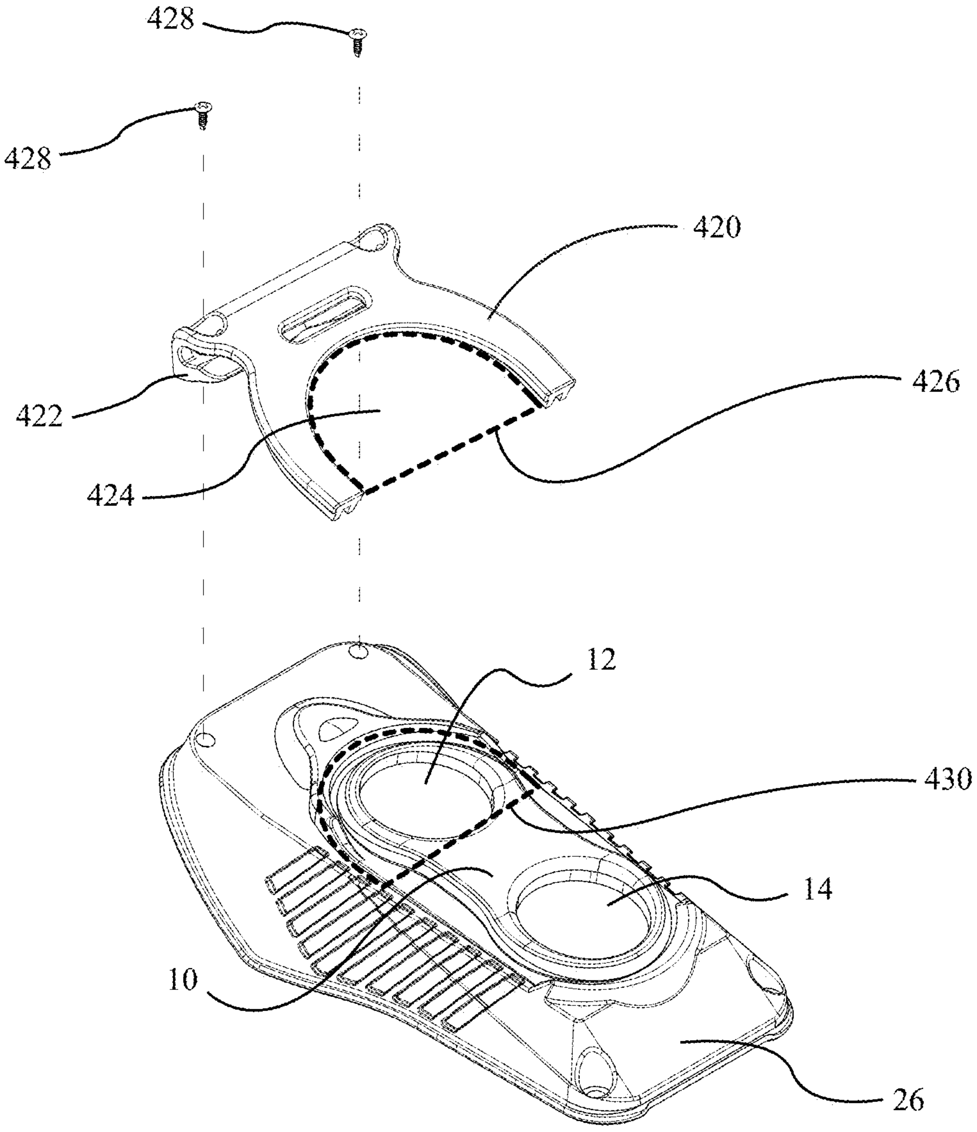
FIG. 26 is a partially exploded perspective view illustrating still another type of attachment device, according to still another alternative embodiment of the invention, wherein a clip member of the attachment device has an open cutout such that a first portion of the removable member is located inside the cutout and a second portion of the removable member is located outside of the cutout.

Turning to FIG. 26, a fourth alternative embodiment of an attachment device will be explained. As shown in this figure, the alternative embodiment of the attachment device comprises a clip member 420 coupled to the rear housing portion 26 of an electronic device via fasteners (e.g., screws 428). Similar to the clip member 20 described above, the clip 420 of the alternative embodiment has a hinge portion 422 about which the clip member 420 is able to pivot. Although, unlike the embodiment of FIGS. 1-21 described above, the clip member 420 has an open cutout 424 such that a first portion of the removable member 10 is disposed within the cutout 424 and a second portion of the removable member 10 is disposed outside the cutout 424 (see FIG. 26). As such, only the first portion of the removable member 10 is disposed within the boundary 426 of the cutout 424, and the projected boundary 430 of the cutout 424 illustrated in FIG. 26.

In one or more embodiments and when the magneto coupler is a magnet, prior to magnetizing, the magnets 16, 18, 122, 124, 216, 218 are laser etched in bulk with a coarse surface texture that maximizes the bonding surface area for use with an adhesive 86. The slight difference in magnet thickness is not an issue for the laser etching process. Any residue can be removed normally, as it is not attracted magnetically to the magnet. The result is a surface that is still smooth, visible to the consumer, and in the best condition for the mating magnet to contact.

In one or more other embodiments, similar to laser etching, a chemical is applied to the surface of the magnet 16, 18, 122, 124, 216, 218 so that it becomes lightly pitted and has an increased surface area for bonding when used with adhesives.

Also, in one or more embodiments, the magnet 16, 18, 122, 124, 216, 218 is molded or machined to have a countersunk hole so that a screw can retain the magnet and maintain an even flush finish on the surface that contacts the mating magnet.

Now, with reference to FIGS. 1-9, 16, 20, and 21, the other features of the illustrative portable speaker 100 will be described. Initially, as shown in FIGS. 1 and 9, the portable speaker 100 of the illustrative embodiment comprises a frame portion 34 disposed between the rear housing portion 26 and the front housing portion 40. The frame portion 34 supports the button structure 36 and the speaker element 38 (see FIG. 9). The front housing portion 40 of the illustrative portable speaker 100 comprises a perforated speaker grille 42, an aperture 44 for accommodating the control button 56, and apertures 46, 48 for receiving the micro-USB port 52 and the headphone jack 54. As will be described in further detail hereinafter, a printed circuit board 50, which may comprise a personal area network module system on a chip (e.g., a Bluetooth® module system on a chip), is provided internally within the housing 26, 40 to control the operation of the portable speaker 100. The micro-USB port 52 and the headphone jack 54 are operatively coupled to the printed circuit board 50.

Referring again to FIG. 1, in the illustrative embodiment, the control button 56 controls multiple functions of the portable speaker 100. The center button portion 66 of the control button 56 activates the speaker 100, plays the audio selection, and pauses the audio selection. If the indicia 58 on the top of the control button 56 is depressed, the volume of the portable speaker 100 is increased. Conversely, if the indicia 60 on the bottom of the control button 56 is depressed, the volume of the portable speaker 100 is decreased. If the indicia 62 on the left side of the control button 56 is depressed, the audio selection being played by the speaker is reversed (i.e., pressing the indicia 62 allows one to go back). Conversely, if the indicia 64 on the right side of the control button 56 is depressed, the audio selection being played by the speaker is advanced (i.e., pressing the indicia 64 allows one to skip ahead). Also, as shown in FIG. 1, the portable speaker 100 of the illustrative embodiment includes a status light 68 for indicating an operational status of the speaker 100.

In the illustrative embodiment, the center button portion 66 of the control button 56 on the portable speaker 100 also has additional functionality. For example, if the user is using the portable speaker 100 for listening to music while walking or running, and he or she wants to take a phone call, the user can depress the center button 66 to take the call. Then, to return back to the music that he or she was listening to on the speaker 100, the user simply taps the center button 66 to go back to the music after completing the phone call.

In the illustrative embodiment, the portable speaker 100 is automatically paired to a Bluetooth® device, such as a smartphone, smartwatch, MP3 player, computer, etc., so the user is not required to manually pair the speaker 100 with the device. The portable speaker 100 is ideal for making phone calls, Skype calls, streaming music, steaming podcasts, etc. In particular, the portable speaker 100 is ideal for making calls on the go. In the illustrative embodiment, the portable speaker 100 is also provided with noise suppression so that the calls made using the device are clearer on the other end of the phone line.

Figure 21:
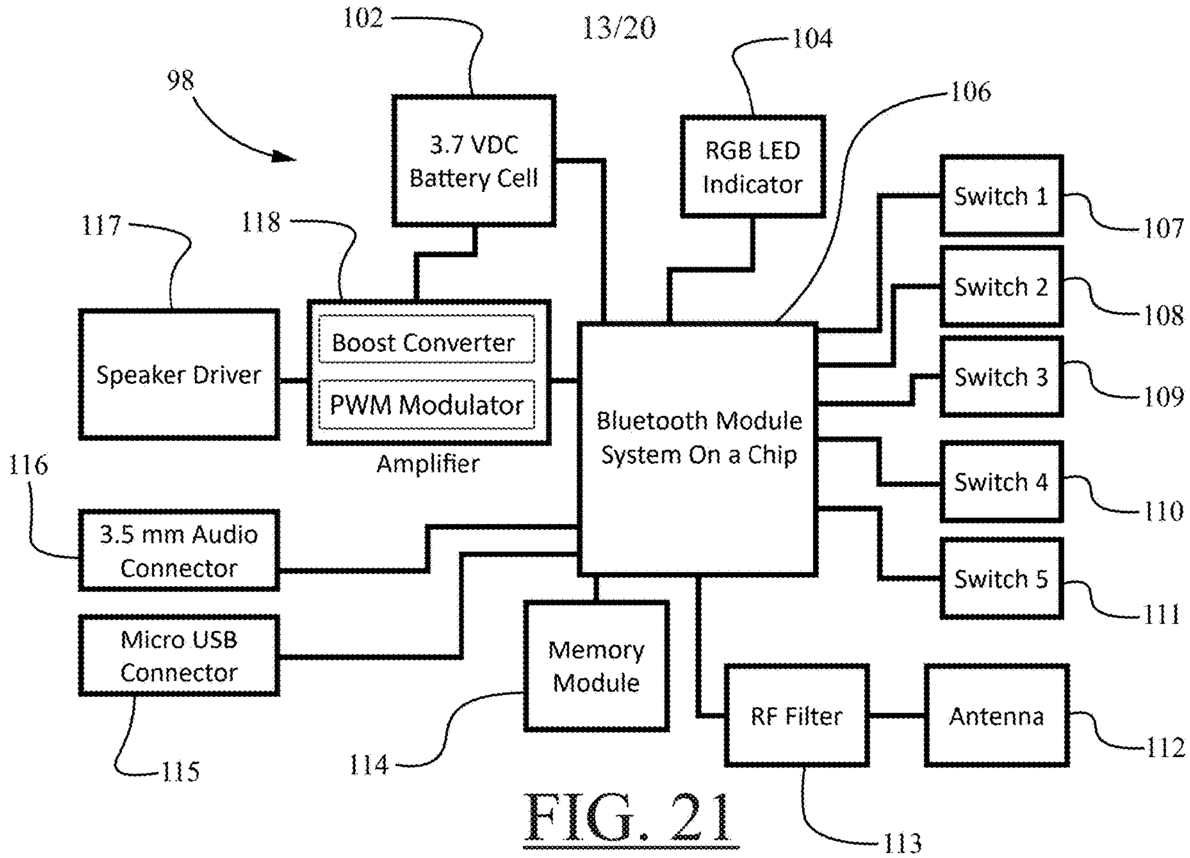
FIG. 21 is a block diagram illustrating exemplary constituent components of the portable speaker of FIG. 1.

Now, with reference to the block diagram 98 of FIG. 21, the electrical components of the illustrative portable speaker 100 will be described. In FIG. 21, the Bluetooth Module System on a Chip (SoC) 106 forms the electronic core of the speaker 100. This System on a Chip (SoC) 106 is a complete Bluetooth Audio chipset solution and handles all of the audio codecs, Bluetooth modem, I/O, Li-Ion charging, indicators and memory management. The core is usually digital signal processing (DSP) based and the firmware is programmable or configured by loading parameters into flash memory. In FIG. 21, the memory module 114 is used to store sections of code and configuration parameters used by the Bluetooth Module SoC 106. The RF filter 113 in FIG. 21 is an active or passive band pass filter used to prevent sideband radiation from being radiated allowing the device to be FCC compliant. The antenna 112 in FIG. 21 is an electrical antenna, which can be any monopole, dipole, helix, whip, ceramic chip, chip, microstrip, metal plate, or printed circuit board antenna. In FIG. 21, the switches 107, 108, 109, 110, 111 are in the form of tactile switches that are momentary or push button which operate to complete a low voltage logic signal detected by the Bluetooth Module SoC 106. The RGB LED indicator 104 in FIG. 21 is a Red, Green, Blue Light Emitting Diode Indicator that is controlled via PWM by the Bluetooth Module SoC to communicate state information to the user (i.e., used for status light 68 in FIG. 1). In FIG. 21, the 3.7 VDC battery cell 102 is a single lithium ion or polymer battery cell with standard protection circuitry including: overvoltage, undervoltage, overcurrent, overcharge, overdischarge, and thermal shutoffs. The cell 102 is the rechargeable power source for the speaker 100 feeding directly the amplifier 118, LEDs, and Bluetooth SoC 106. The amplifier 118 in FIG. 21 provides the switched voltage audio signal via Pulse Width Modulation (PWM) to the speaker driver 117. In FIG. 21, the speaker driver 117 is a voice coil suspended in a permanent magnetic field via a surround and displacing air via the dust cap to produce sound pressure levels (SPL) audible to a user. The 3.5 mm Audio Connector 116 in FIG. 21 provides the typical headphone style connector as an optional port to output stereo signals from the Bluetooth Module SoC 106. Finally, the micro-USB connector 115 (i.e., a micro universal serial bus connector 115) provides an input for 5 VDC to the Bluetooth Module SoC 106 for charging the 3.7 VDC battery cell 102 or to interface with the memory module 114 to update firmware or configurations of the Bluetooth Module SoC 106.

In the illustrative embodiment, the portable speaker 100 advantageously produces a high sound pressure level (SPL) without requiring excessive battery power. More specifically, by reducing the number of turns on the voice coil, the speaker direct current resistance (DCR) can be reduced below 4-ohms to around 2-ohms or lower. Additionally, the Back-emf voltage generated during similar sound pressure levels is lower by the relationship $Vemf=Bl\times v(t)$. The velocity v(t) correlates to SPL and the Force/Back-emf Constant Bl is related to the number of turns inside the voice coil, which have been reduced. As a result of the lower DCR and Back-emf voltage, by Ohm's Law less voltage is required at the speaker terminal to obtain the same sound pressure level (SPL). For lightweight, portable speaker applications, this solution allows for a single battery cell to be used and traditional 5-6 VDC boost circuits to be used to achieve the highest desired SPL. In the illustrative embodiment, the number of turns on the voice coil of the speaker element is reduced by approximately half of the number of turns that is required by a 4-ohm speaker to produce a 2-ohm speaker.

In the illustrative embodiment, with reference to FIG. 20, it can be seen that the speaker driver 117 inside the housing 26, 40 and speaker grille 42 on the front housing 40 is angled such that the entire device 100 can be attached to an article of clothing with an orientation that allows the speaker 100 to project sound waves 90 at the cars of the user 88. The treble clef will not be attenuated and less power will be consumed by the portable speaker 100. In the illustrative embodiment, the angle θ between the bottom surface 92 of the rear housing 26 and the speaker grille 42 of the front housing 40 is between approximately 40 degrees and approximately 50 degrees, inclusive (or between 40 degrees and 50 degrees, inclusive). More specifically, in the illustrative embodiment, the angle θ between the bottom surface 92 of the rear housing 26 and the speaker grille 42 of the front housing 40 is approximately 45 degrees.

Figure 16:
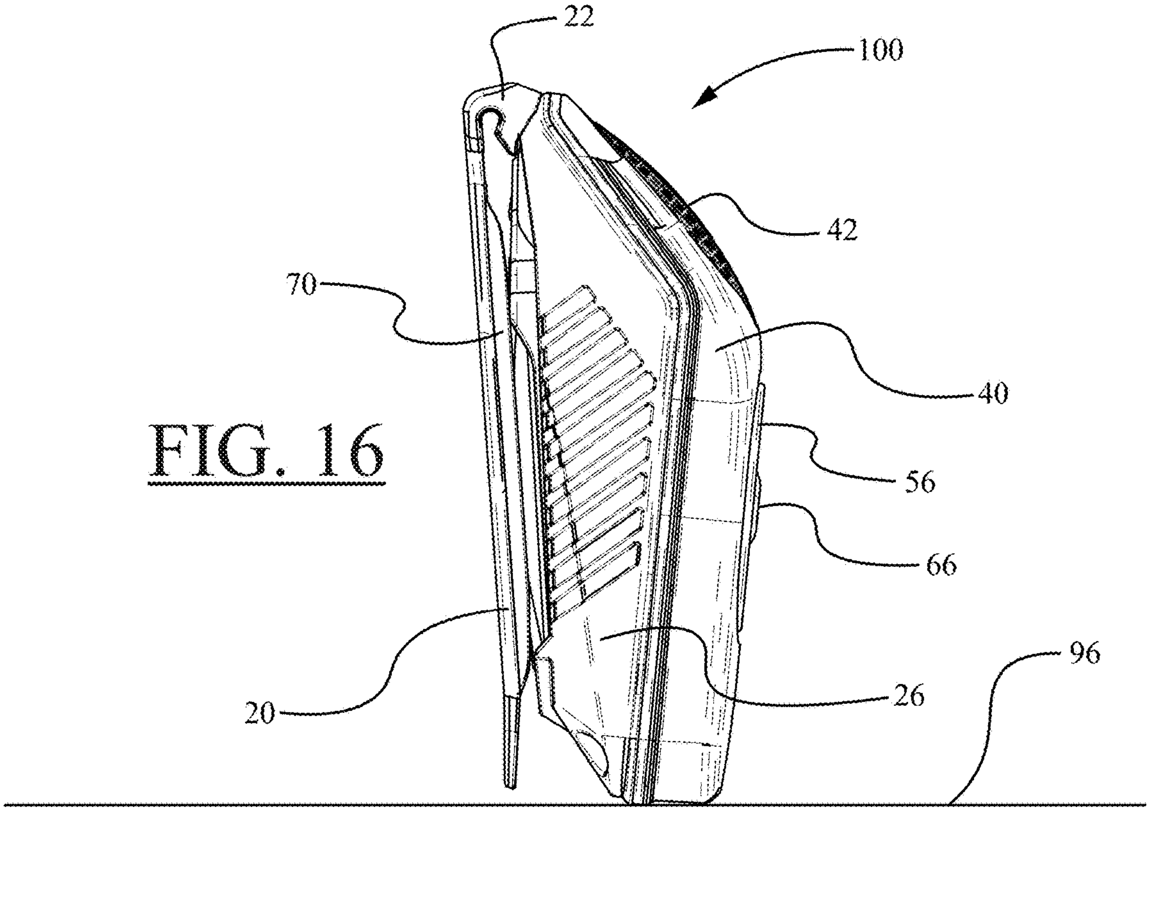
FIG. 16 is a side elevational view of the portable speaker of FIG. 1 disposed on a tabletop surface, which illustrates the manner in which the portable speaker is able to stand upright on the tabletop surface.

With reference to FIG. 16, in the illustrative embodiment, it can be seen that the configuration of the housing the portable speaker 100 advantageously allows the speaker 100 to stand upright on a tabletop surface 96 so that sound may be projected upward to the cars of a user.

Advantageously, in the illustrative embodiment, the portable speaker 100 weighs approximately 39 grams (e.g., less than a pack of gum). As such, the portable speaker 100 is one of the lightest, loudest wearable Bluetooth speakers that is available. Also, the portable speaker 100 has a superior battery life (e.g., 12 hours or more of battery life). In addition, the portable speaker 100 is generally waterproof and durable such that it is capable of sustaining a significant impact without being damaged.

Figure 27:
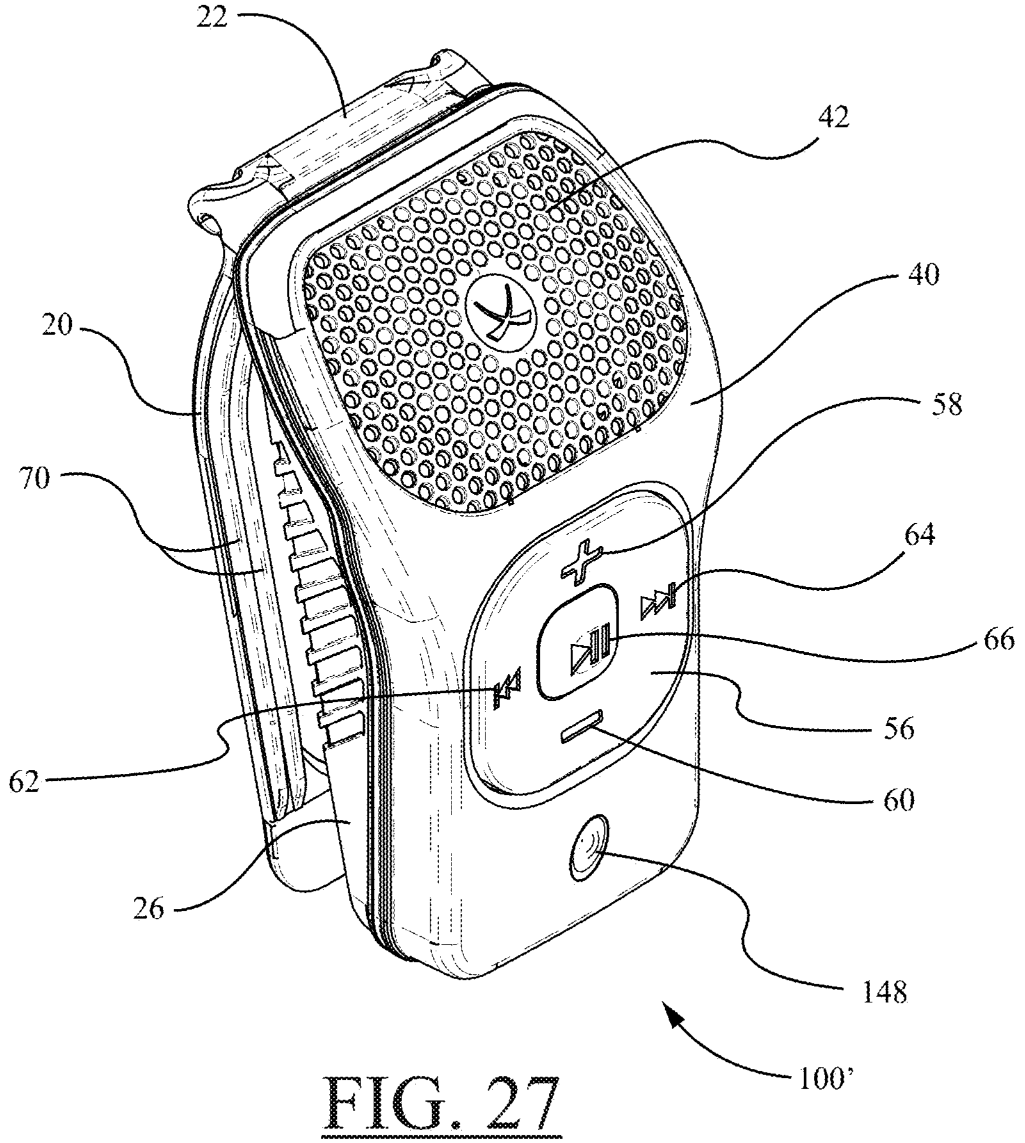
FIG. 27 is a frontal perspective view of a portable speaker having a built-in camera, according to an alternative embodiment of the invention.

An alternative embodiment of the portable speaker 100' is illustrated in FIG. 27. The portable speaker 100' of FIG. 27 is similar in most respects to the portable speaker 100 described above, except that a camera is provided in lieu of the status light 68. In particular, as shown in FIG. 27, the portable speaker 100' is provided with a camera assembly having a camera lens 148 (i.e., an imager assembly) that is in the location on the housing 40 occupied by the status light 68 in the embodiment of FIG. 1.

Any of the features or attributes of the above described embodiments and variations can be used in combination with any of the other features and attributes of the above described embodiments and variations as desired. As it is used throughout this disclosure, the conjunction "and/or" means one, or the other, or both (e.g., when reference is made to "a non-metallic and/or non-magnetic item", this refers to an item that is just non-metallic, an item that is just non-magnetic, or an item that is both non-metallic and non-magnetic).

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A portable audio speaker system, comprising:

at least one speaker assembly including a housing;

a speaker element disposed within the housing;

an audio amplifier coupled to the speaker element;

at least one discrete exterior control button that is physically separate from a speaker grille of the housing, the at least one discrete exterior control button configured to initiate a plurality of device functions of the at least one speaker assembly;

a charging interface disposed on the housing and configured to receive electrical power from an external source to charge an internal power supply of the portable audio speaker system; and a clip member coupled to the housing, the clip member and the housing together forming a clipping device;

wherein the clipping device allows the housing to be coupled to, and decoupled from, an edge of an item;

wherein the audio amplifier provides a switched voltage audio signal to the speaker element via pulse-width modulation (PWM);

wherein the internal power supply comprises a single-cell lithium battery, and the audio amplifier comprises a boost converter configured to raise the single-cell lithium battery to a voltage of about 5 to 6 volts for driving the speaker element via the PWM; and wherein the at least one discrete exterior control button is operable to initiate a user-selected one of the plurality of device functions, the plurality of device functions including at least two of the following device functions: (i) activating the speaker element, (ii) playing an audio selection, (iii) pausing an audio selection, (iv) answering a phone call, (v) terminating a phone call, (vi) returning to an audio selection after completing a phone call, (vii) increasing a volume of the speaker element, (viii) decreasing the volume of the speaker element, (ix) advancing an audio selection, or (x) reversing an audio selection.

2. The portable audio speaker system according to claim 1, wherein the charging interface is operatively coupled to a printed circuit board disposed within the housing, and the charging interface comprises one of: (i) a set of charging contacts, or (ii) a female port receptacle formed within an aperture of the housing.

3. The portable audio speaker system according to claim 2, wherein the charging interface comprises the female port receptacle, and the female port receptacle comprises a Universal Serial Bus (USB) port.

4. The portable audio speaker system according to claim 1, further comprising a microphone.

5. The portable audio speaker system according to claim 1, further comprising a spring element coupling the clip member to the housing.

6. The portable audio speaker system according to claim 1, further comprising a Bluetooth wireless interface configured to pair the portable audio speaker system to a mobile device.

7. A portable audio speaker system, comprising:

at least one speaker assembly including a housing;

a speaker element disposed within the housing;

an audio amplifier coupled to the speaker element;

an internal power supply comprising a single-cell lithium battery;

at least one discrete exterior control button that is physically separate from a speaker grille of the housing, the at least one discrete exterior control button configured to initiate a plurality of device functions of the at least one speaker assembly;

a clip member coupled to the housing, the clip member and the housing together forming a clipping device;

wherein the clipping device allows the housing to be coupled to, and decoupled from, an edge of an item;

wherein the at least one discrete exterior control button is operable to initiate a user-selected one of the plurality of device functions, the plurality of device functions including at least two of the following device functions: (i) activating the speaker element, (ii) playing an audio selection, (iii) pausing an audio selection, (iv) answering a phone call, (v) terminating a phone call, (vi) returning to an audio selection after completing a phone call, (vii) increasing a volume of the speaker element, (viii) decreasing the volume of the speaker element, (ix) advancing an audio selection, or (x) reversing an audio selection;

wherein the audio amplifier provides a switched voltage audio signal to the speaker element via pulse-width modulation (PWM); and wherein the audio amplifier comprises a boost converter configured to raise the single-cell lithium battery to a voltage of about 5 to 6 volts for driving the speaker element via the PWM.

8. The portable audio speaker system according to claim 7, further comprising:

a charging interface disposed on the housing and configured to receive electrical power from an external source to charge an internal power supply of the portable audio speaker system.

9. The portable audio speaker system according to claim 8, wherein the charging interface is operatively coupled to a printed circuit board disposed within the housing, and the charging interface comprises one of: (i) a set of charging contacts, or (ii) a female port receptacle formed within an aperture of the housing.

10. The portable audio speaker system according to claim 9, wherein the charging interface comprises the female port receptacle, and the female port receptacle comprises a Universal Serial Bus (USB) port.

11. The portable audio speaker system according to claim 7, further comprising a microphone.

12. The portable audio speaker system according to claim 7, further comprising a spring element coupling the clip member to the housing.

13. The portable audio speaker system according to claim 7, wherein the at least one discrete exterior control button performs at least three of the following device 2 functions: (i) activating the speaker element, (ii) playing an audio selection, (iii) pausing an audio selection, (iv) answering a phone call, (v) terminating a phone call, (vi) returning to an audio selection after completing a phone call, (vii) increasing a volume of the speaker element, (viii) decreasing the volume of the speaker element, (ix) advancing an audio selection, or (x) reversing an audio selection.

14. The portable audio speaker system according to claim 7, further comprising a Bluetooth wireless interface configured to pair the portable audio speaker system to a mobile device.

15. A portable audio speaker system, comprising:

at least one speaker assembly including a housing;

a speaker element disposed within the housing;

an audio amplifier coupled to the speaker element;

an internal power supply comprising a single-cell lithium battery;

a clip member coupled to the housing, the clip member and the housing together forming a clipping device; and a spring element coupling the clip member to the housing;

wherein the clipping device allows the housing to be coupled to, and decoupled from, an edge of an item;

wherein the audio amplifier provides a switched voltage audio signal to the speaker element via pulse-width modulation (PWM); and wherein the audio amplifier comprises a boost converter configured to raise the single-cell lithium battery to a voltage of about 5 to 6 volts for driving the speaker element via the PWM.

16. The portable audio speaker system according to claim 15, further comprising:

a charging interface disposed on the housing and configured to receive electrical power from an external source to charge the internal power supply of the portable audio speaker system.

17. The portable audio speaker system according to claim 16, wherein the charging interface is operatively coupled to a printed circuit board disposed within the housing, and the charging interface comprises one of: (i) a set of charging contacts, or (ii) a female port receptacle formed within an aperture of the housing.

18. The portable audio speaker system according to claim 17, wherein the charging interface comprises the female port receptacle, and the female port receptacle comprises a Universal Serial Bus (USB) port.

19. The portable audio speaker system according to claim 15, further comprising a microphone.

20. The portable audio speaker system according to claim 15, further comprising:

a control button configured to initiate a plurality of functions of the at least one speaker assembly.

21. The portable audio speaker system according to claim 20, wherein the control button performs at least two of the following device functions: (i) activating the speaker element, (ii) playing an audio selection, (iii) pausing an audio selection, (iv) answering a phone call, (v) terminating a phone call, (vi) returning to an audio selection after completing a phone call, (vii) increasing a volume of the speaker element, (viii) decreasing the volume of the speaker element, (ix) advancing an audio selection, or (x) reversing an audio selection.

22. The portable audio speaker system according to claim 15, further comprising a Bluetooth wireless interface configured to pair the portable audio speaker system to a mobile device.

* * * * *